US007433944B2

(12) United States Patent
Kanada et al.

(10) Patent No.: US 7,433,944 B2
(45) Date of Patent: Oct. 7, 2008

(54) NETWORK, SERVER, AND STORAGE POLICY SERVER

(75) Inventors: Yasusi Kanada, Tokyo (JP); Atsushi Aoki, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 792 days.

(21) Appl. No.: 10/310,019

(22) Filed: Dec. 5, 2002

(65) Prior Publication Data

US 2003/0115313 A1 Jun. 19, 2003

(30) Foreign Application Priority Data

Dec. 7, 2001 (JP) .......................... P2001-373522

(51) Int. Cl.
*G06F 15/173* (2006.01)
(52) U.S. Cl. .................... 709/223; 709/217; 709/220; 709/224; 709/230
(58) Field of Classification Search ................ 709/220, 709/221, 222, 223, 224, 232, 217, 230
See application file for complete search history.

(56) References Cited

U.S. PATENT DOCUMENTS

| 5,797,128 | A | * | 8/1998 | Birnbaum ........................ 707/5 |
| 5,872,928 | A | * | 2/1999 | Lewis et al. ................... 709/222 |
| 5,889,953 | A | * | 3/1999 | Thebaut et al. .............. 709/221 |
| 6,167,445 | A | * | 12/2000 | Gai et al. ...................... 709/223 |
| 6,170,009 | B1 | * | 1/2001 | Mandal et al. ............... 709/223 |
| 6,473,851 | B1 | * | 10/2002 | Plutowski ........................ 713/1 |
| 6,539,425 | B1 | * | 3/2003 | Stevens et al. ............... 709/220 |
| 6,578,076 | B1 | * | 6/2003 | Putzolu ........................ 709/223 |
| 6,611,864 | B2 | * | 8/2003 | Putzolu et al. ............... 709/223 |
| 6,718,380 | B1 | * | 4/2004 | Mohaban et al. ............ 709/223 |
| 6,839,766 | B1 | * | 1/2005 | Parnafes et al. ............. 709/232 |
| 6,839,776 | B2 | * | 1/2005 | Kaysen ........................ 710/36 |
| 7,003,578 | B2 | * | 2/2006 | Kanada et al. .............. 709/230 |

OTHER PUBLICATIONS

"A Policy Server Under Production", Jun. 1999, Nikkei Internet Technolgy, pp. 144-151.

(Continued)

*Primary Examiner*—Saleh Najjar
*Assistant Examiner*—Shawki S Ismail
(74) *Attorney, Agent, or Firm*—Reed Smith LLP; Stanley P. Fisher, Esq.; Juan Carlos A. Marquez, Esq.

(57) ABSTRACT

A policy system that can add/delete policies easily to/from devices as needed through existing interfaces and enable policies to be developed quickly on-site and applied to devices provided with new device interfaces and new commands. A policy manager registers each defined policy type in a database after the definition and searches and refers to the defined policy type upon receiving a policy so as to check the validity of the policy. A policy agent registers each defined policy translation rule in a database after the definition. Upon receiving a policy, the policy agent searches and uses the translation rule to translate the policy to a command string.

16 Claims, 18 Drawing Sheets

OTHER PUBLICATIONS

M. Fine, K. McCloghris, J. Seligson, K Chan, S. Hahn, C. Bell, A. Smith, F. Reichmeyer "Differentiated Services Quality of Service Policy Information Base", Internet Engineering Task Force, Internet Draft, pp. 1-94.

"HP OpenView PolicyXpert User's Guide", Mar. 2001, pp. 1-140.

R. Moore, E. Ellesson, J, Strassner, A. Westerinen, "Policy Core Information Model—Version 1 Specification", Standards Track Memo (Feb. 2001), pp. 1-100.

B. Moore (Editor), "Policy Core Information Model Extensions", (May 28, 2002) Policy Framework Working Group Internet Draft, Standards Track Memo, pp. 1-87.

D. Durham, J. Boyle, R. Cohen, S. Herzog, R. Rajan and A. Sastry, "The COPS (Common Open Policy Service) Protocol", Standards Track Memo (Jan. 2000), pp. 1-38.

"COPS Usage for Policy Provisioning (COPS-PR)", (Mar. 2001) Standards Track, pp. 1-34.

S. Blake, D. Black, M. Carlson, E. Davies, Z. Wang, W. Weiss "An Architecture for Differentiated Services", (Dec. 1998) Informational Memo, pp. 1-36.

K. Nichols, V. Jacobson, L. Zhang "A Two-Bit Differentiated Services Architecture for the Internet", (Jul. 1999) Informational Memo, pp. 1-26.

M. Fine, K. McCloghris, J. Seligson, K Chan, S. Hahn, C. Bell, A. Smith, F. Reichmeyer "Differentiated Services Quality of Service Policy Information Base", Internet Engineering Task Force, Internet Draft, pp. 1-94, Jun. 2002.

\* cited by examiner

FIG. 4

```
policy SwitchCommands:PolicyToCommand is if name="QoS"
    then
        policy_installation_epilogue=
            [Table,
             [interfaceTable[interface],
              "ICC", dontCare, ACL, 1]]
        policy_removal_prologue=
            [Table,
             [interfaceTable[interface],
              "ICC", dontCare, ACL, 0]]
        rule_initialization=
            [ACL=list_number('ACL', 0, 1023)]
        rule_installation_commands=
            [Table,
             [AccessControlTable[ACL],
              "CCIL"
              1,
              condition('access')=='deny'?0
              :condition('access')=='permit' |
                condition('access')=='low_priority'?1
              :condition('access')=='high_priority'?2
              dontCare,
              condition('user_class')]|0]]
        rule_removal_commands=
            [[AccessControlTable[ACL],
              "CC", 0, 0]
    end if;
end
```

FIG. 5

```
policy ServerCommands:PolicyToCommand is          —502 511
                                                       /
    if  name='QoS' —512              513
    then                              /
        rule_installation_commands=
          [CLI,
            [ "allocate-servers %s %s" ,
              condition('user_class'),
              action('access')= ='deny' ?0%
              :action('access')= ='permit' |
                action('access')= ='low_priority, ?20%
              :action('access')= ='high_priority' ?50%,
              condition('user class')||0]]
        rule_removal_commands=                    )
          [CLI,                                  516
            [ "allocate-servers %s %s" ,—517
              condition('user_class')
              "default" ]]
    end if;
end
```

501 502 511 512 513 516 517

F I G. 6

```
policy StorageCommands:PolicyToCommand is       ~602    611 if  name='QoS'  ~612                                   613
   then
      rule_installation_commands=
        [MIB,
         set(storage_mib.caching.unit,
             condition('user_class')),
         set(storage_mib.caching.strategy,
             action('access')= ='deny' |
            :action('access')= ='permit' |
             action('access')= ='low_priority'?'nocache'
            :action('access')= ='high priority'?'cache')],
                                                          616
      rule_removal_commands=
        [MIB,
            set(storage_mib.caching.unit,
                                                    ~617
            condition('user_class'))
          set(storage_mib.caching.strategy,
             'nocache')]
   end if;
end
```

FIG. 7

```
policy VariableDefinition:PolicyVariableDefinition is    ~702
    if  name='user class'                    ~712
    then                                                  ~711
        value type=['user class']            ~713
    end if;

if  name='time'                          ~722
    then                                                  ~721
        value type=['time','time range']     ~723
    end if;
end
```
~701

FIG. 8

```
policy SwitchValueTranslation:PolicyValueTranslation is
    if  name='user class'                    ~812
    then                                                  ~811
        result= value= ='Sales' ?
                10.1.0.0/255.255.0.0         ~813
              :value= ='Development' ?
                10.2.0.0/255.255.0.0
    end if;
end
```
~801
~802

FIG. 9

```
policy ServerValueTranslation:PolicyValueTranslation is
    if name='user class'
    then
        result= value= ='Sales' ?
                UserID(['Mike','Cindy','Dick'])
               :value= ='Development' ?
                UserID(['Nancy','Bob','Bill'])
    end if;
end
```

FIG. 10

```
policy StorageValueTranslation:PolicyValueTranslation is
    if name='user class'
    then
        result= value= ='Sales' ?
                SalesDB)
               :value= ='Development' ?
                ProductDB)
    end if;
end
```

FIG. 11

```
policy PrioritizeMarketing:QoS is          ~1102
    if  time=time_range(9:00, 10:00),
        user_class='Marketing'             ~1112
    then
        access='high_priority'             ~1113
    end if;
end
```
1101
1111

FIG. 12

Policy Manager — 212

- 1211 UPPER LAYER RECEIVER
- 1213 SERVER POLICY COMPILER
- 1214 SERVER POLICY DATABASE
- 1212 MANAGER CONTROLLER
- 1215 POLICY CHECKER
- 1216 MID LAYER SENDER
- 213 POLICY REPOSITORY

NETWORK, SERVER, AND STORAGE POLICY SERVER

BACKGROUND OF THE INVENTION

1. Field of the Invention

The present invention relates to a method for controlling a network configured by such network nodes as LAN switches, etc., as well as Web and other servers and SAN, NAS, and other storage devices.

2. Description of the Related Art

A conventional network policy controlling method has been discussed, for example, in the IETF (Internet Engineering Task Force) and the following document describes the method briefly "A policy server under production" pp.144 to 151, June, 1999, Nikkei Internet Technology.

In a network system that does not control policies, control of the QoS management function (service quality management function), the security management function, etc. is set individually in each network device. In a network system that controls policies, however, it is possible to specify the policies throughout the network. Thus, the user is required to input only a small amount of setting information. In addition, the time can be subdivided to change policies and policies can be changed dynamically in response to a request from an application program. Thus, the network comes to be controlled more efficiently, which is usually not realized by any operator.

A policy is usually described as a list of rules referred to as policy rules. Policy rules are condition-action type rules. In other words, a policy rule describes an action to be performed when its condition is satisfied. One policy can include any condition and action. However, it is also possible to limit a policy rule so that one policy includes only a policy rule having a specific format and item to simplify policy processings and user interfaces. The policy server PolicyXpert (TM), which is a joint product of Hewlett-Packard Company and Hitachi, Ltd., is configured so that one policy includes only a specific type policy rule by employing a concept for action patterns that can be specified in policy rules. Consequently, each policy has a pattern (policy pattern) corresponding to an action pattern to be included therein. The format and meaning of the PolicyXpert policy are described in the following document.

HP OpenView PolicyXpert User's Guide, J1360-90010 (http://ovweb.external.hb.com/ovnsmdps/pdf/j1360-90010.pdf), Hewlett-Packard, 2001.

The formats and meanings of policies are now standardized as "policy information models" in the IETF (Internet Engineering Task Force). The core information model is described in the following documents:

Moore, B., Ellesson, E., Strassner, J., and Westerinen, A., "Policy Core Information Model Version 1 Specification", RFC 3060, (http://www.ietf.org/rfc/rfc3060.txt), IETF, February 2001.

Moore, B., Rafalow, L., Ramberg, Y., Smirk, Y., Strassner, J., Westerinen, A., Chadha, R., Brunner, M., Cohen, R., "Policy Core Information Model Extensions", draft-ietf-policy-pcim-ext-05.txt (http://www.ietf.org/internet-drafts/draft-ietf-policy-pcim-ext-05.txt), Internet Draft, IETF, 2001

Although there are a plurality of protocols used to download policies to devices, the COPS (Common Open Policy Service) protocol is usually used. The COPS protocol is proposed by the IETF in the following documents:

The COPS (Common Open Policy Service) Protocol edited by D. Durham, RFC 2748, (http://www.ietf.org/rfc/rfc2748.txt), IETF, 2000; and COPS Usage for Policy Provisioning (COPS-PR) written by F. Reichmeyer et al, RFC 3084, (http://www.ietf.org/rfc/rfc3084.txt), IETF, 2001.

A PIB (Policy Information Base) is also proposed to describe policies to be downloaded. The following document describes one of the examples.

Quality of Service Policy Information Base, draft-mfile-cops-pib-05.txt written by M. Fine et. al., (http://www.ietf.org/internet-drafts/draft-mfine-cops-pib-05.txt), Internet Draft, IETF, 2001.

A conventional technique for assuring the QoS (Quality of Service) in the Internet is the Differentiated Services Technique ("the DiffServ technique"). The DiffServ technique is described in the following documents:

An Architecture for Differentiated Services written by S. Blake et al, RFC 2475, (http://www.ietf.org/rfc/rfc2475.txt), IETF, 1998; and A Two-bit Differentiated Services Architecture for the Internet written by K. Nichols et al, RFC 2638, (http://www.ietf.org/rfc/rfc2638.txt), IETF, 1999.

The DiffServ technique, when a series of packets are communicated from the first network application to a second network application through a network, those packets are considered as one "flow" or a series of packets flow. The DiffServ technique can determine whether or not a flow includes an IP packet by identifying the IP addresses at both start and end of the IP packet, the protocol type, and the port when the protocol is TCP or UDP.

In a path from the first network application to the second network application, at first, a network inlet edge router is formed, then no router, otherwise one or more core routers are formed, and finally, a network outlet edge router is formed. The DiffServ technique marks a plurality of flows with a specific value set in the DS field (Differentiated Services field) of each packet at the inlet edge router so as to handle all the packets having the value as one flow (aggregated flow) collectively in the succeeding processings. The value set in the DS field is referred to as a DSCP (Differentiated Services CodePoint). Creating such an aggregated packet flow makes it possible for the core router to determine only the DSCP to control the QoS conditions as a band width, packet transfer priority, etc. of each aggregated flow. The use of the DiffServ will thus make it possible to aggregate a flow, determine the flow only with the DSCP, and reduce the load of the core router that controls the QoS conditions.

The use of the DiffServ technique also makes it possible to assure the end-to-end communication quality even in a network configuration comprising a plurality of networks such as a LAN through the Ethernet or a WAN through an IP net, etc. This is because flow identification and priority controlling can be realized similarly in those networks.

While networks, servers that are actually work stations, personal computers, and disk storage devices have been developed independently of each another, a concept that those items should be managed integrally is now being promoted. For example, when a LAN, a WAN between offices, a Web server, a database server, and storage devices used for them are controlled integrally with use of policies in a corporation, those items can be employed more strategically.

In such an environment, it is required firstly to enable a usable latest technique to be controlled with use of policies immediately after introduction and those policies to be designed/used in accordance with needs. There is no time to wait for standardized policies and QoS conditions to be issued the IETF as described above. In the conventional policy systems, the users have only been allowed to handle policies having specific functions pre-installed in policy servers and policy agents.

Furthermore, the environment as described above often includes the second problem that policies have to be distributed to network devices, servers, and storage devices so that those devices can be managed integrally. The conventional policy systems have enabled the users to combine only predetermined types of device interfaces for use such as, for example, a combination of a Simple Network Management Protocol (SNMP) and a (Management Information Base) (MIB), a combination of a COPS-PR and a PIB, and a specific command-line interface (CLI) and a specific API, are only allowed for use; devices that do not have any of the interfaces cannot be used. Consequently, those systems have been limited and can control only some of the devices even in a comparatively standardized network. Controlling of those devices with policies has hardly been possible in servers and storage devices that have not yet been standardized.

SUMMARY OF THE INVENTION

According to at least one preferred embodiment of the present invention, a method for adding policies as needed using existing interfaces to add those policies easily. In accordance with the present invention, there is no need to employ any general-use programming languages or new interfaces that would require users to undergo special training.

Also in accordance with the present invention, policies can be developed quickly on sites and applied to new devices provided with new device interfaces and new commands as needed.

The present invention is generally embodied in a policy manager and a policy agent provided in a policy server and a policy agent.

The policy manager, when instructed to add or delete a device-independent policy class, that is, a policy type described in a policy format, stores or deletes the policy class definition in or from the first database and, when receiving a policy of a type defined by the policy class definition, checks the validity of the policy by referring to the policy class definition taken out from the first database.

The policy agent, when instructed to add/delete a device dependent translation rule used to translate a specific type policy described in a policy format to a command sequence, stores/deletes the translation rule in/from the second database and, when receiving an above-described type policy, uses the translation rule taken out from the second database to translate the received policy to a command sequence.

The use of the policy manager thus makes it possible to add a policy class having a new function and check the validity of each policy belonging to the policy class. The use of the policy agent makes it possible to set a policy belonging to a specific policy class for a device. Consequently, it becomes possible to add/delete each policy class having a new function as needed. It is also possible to apply each policy belonging to a policy class specific to a device having a new device interface and a new command to a device as needed.

Other and further objects, features and advantages of the present invention will appear more fully from the following description.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 4 is a chart of a "SwitchCommands" policy to be input to the policy server 112 of FIG. 1;

FIG. 5 is a chart of a "ServerCommands" policy to be input to the policy server 112 of FIG. 1;

FIG. 6 is a chart of a "StorageCommands" policy to be input to the policy server 112 of FIG. 1;

FIG. 7 is a chart of a "VariableDefinition" policy to be input to the policy server 112 of FIG. 1;

FIG. 8 is a chart of a "SwitchValueTranslation" policy to be input to the policy server 112 of FIG. 1;

FIG. 9 is a chart of a "ServerValueTranslation" policy to be input to the policy server 112 of FIG. 1;

FIG. 10 is a chart of a "StorageValueTranslation" policy to be input to the policy server 112 of FIG. 1;

FIG. 11 is a chart of a "PrioritizeMarketing" policy to be input to the policy server 112 of FIG. 1;

FIG. 12 is a block diagram of a policy manager 212 of FIG. 2;

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided herein below with reference to the attached drawings.

In at least one preferred embodiment, the present invention relates to a system of a Corporation X, which is a virtual computer system development/marketing corporation. Corporation X collects detailed information of customers, integrates the information in a database, and supplies the information to its staff through the Internet. Corporation X has a manufacturing department and a sales department. In the sales department, salesmen input the information collected on the previous day in the database every morning intensively between 9 and 10 AM. Consequently, it is an object of Corporation X to describe a policy so as to assign the network, server, and storage resources of the corporation to the sales department with priority every morning between 9 and 10 AM. More specifically, the object is to give higher priority to traffic from the sales department than from other departments in the network (LAN) in that time band. It is another object of Corporation X to allocate 50% of the server capacity to the sales department, when necessary. It is still another object to enable the sales department to effectively access the storage resources (SAN and NAS) by specifying caching of the data therein. The above objects are described in one policy to effectively allocate network, server and storage resources.

Figure 1:
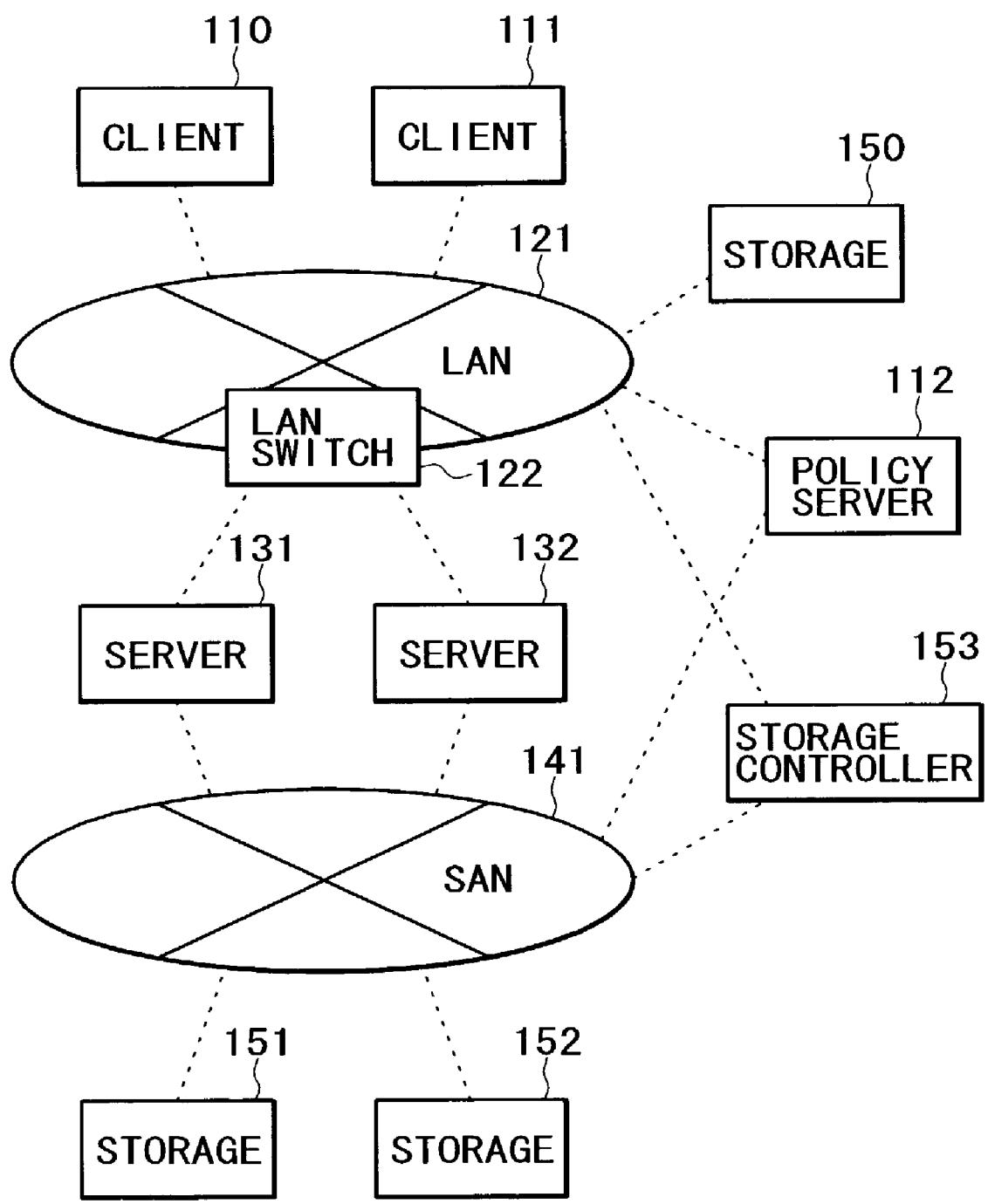
FIG. 1 is a block diagram of a network in an embodiment of the present invention.

FIG. 1 shows a configuration that includes a network and devices of this first preferred embodiment of the present invention. A LAN (Local Area Network) 121 is connected to clients 110 and 111. Each of the clients 110 and 111 may comprise any of a PC, a hand-held computer, and a portable phone. The LAN 121 includes a switch 122 connected to servers 131 and 132. The servers 131 and 132 are also connected to a-SAN (Storage Area Network) 141. The SAN 141 is connected to storage devices 151 and 152, as well as a storage controller 153 used to control the storage devices 151 and 152. The storage controller 153 is connected to the LAN 121 so as to control the above devices through the LAN 121. The LAN 121 is also connected to a NAS (Network Attached Storage) 150. A policy server 112 is connected to the LAN 121 so as to integrally control devices connected to the SAN 141 through both of the LAN 121 and the storage controller 153.

Figure 2:
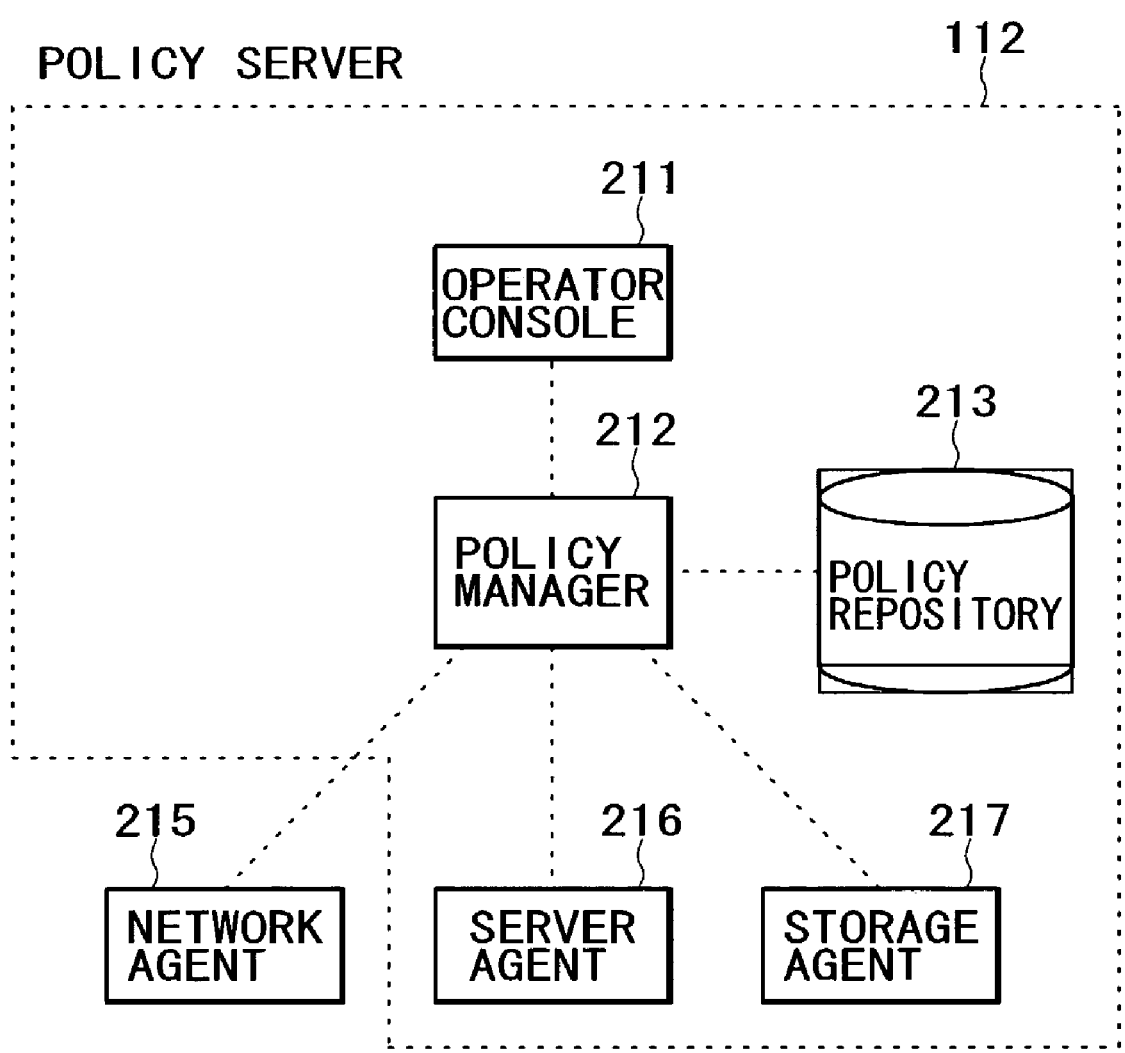
FIG. 2 is a block diagram of a policy server 112 of FIG. 1.

Next, a configuration of the policy server 112 will be described with reference to FIG. 2. The policy server 121 may be such a general computer as a personal computer or workstation. Among the components in the configuration shown in FIG. 2, an operator console 211 is configured by input/output devices such as a display unit, a keyboard, and a mouse, as well as software. Other functions of the policy server 112 are realized by the software. A policy repository 213 is placed in a hard disk or main memory.

The operator console 211 receives inputs of the operator and outputs data to the operator. The operator console 211 is used to add/delete/update each policy and/or policy rule. A policy manager 212 controls the input/output to/from the operator console 211. Each input policy is stored in the policy repository 213 and sent to the LAN switch 122 through a network agent 215 and to the servers 131 and 132 through the server agent 216. The input policy is also sent to the storage 150 through the storage agent 217 and to the storage devices 151 and 152 through the storage controller 153. The server agent 216 and the storage agent 217 are placed in the policy server 121 while the network agent 215 is placed outside the policy server 121. This is because the network agent 215 is located in the LAN switch 121 and accesses a hardware table located in the LAN switch 121.

Figure 3:
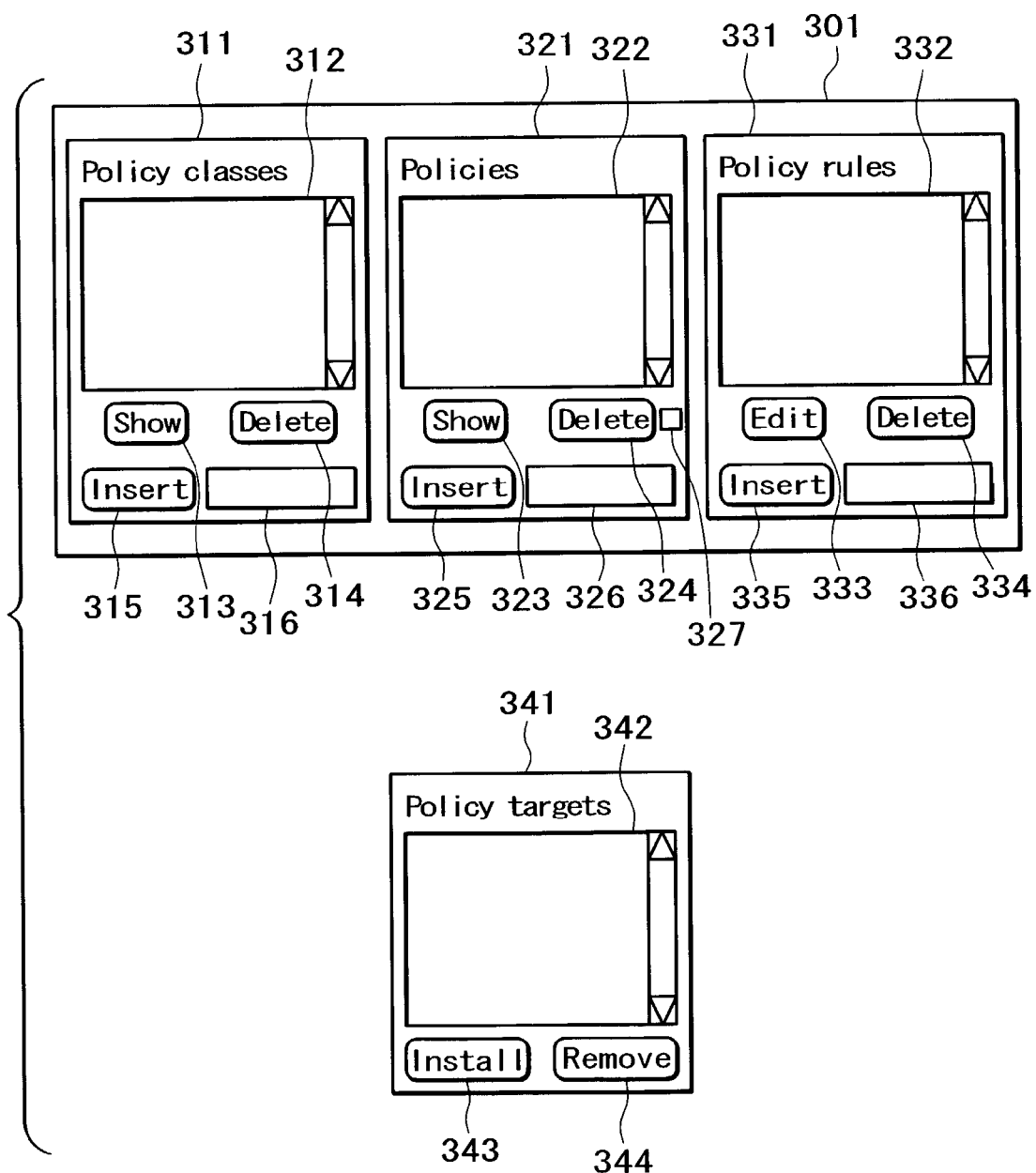
FIG. 3 is a GUI chart for describing an operator console 211 of FIG. 2.

Next, the main screen 301 of the operator console 211 will be described with reference to FIG. 3. The main screen 301 is used to specify display, definition, and deletion of policies and policy rules. A policy class means a collection of policies having the following characteristics; each policy belonging to a policy class has a dedicated function and a predetermined range of conditions and actions. The concept of the policy class is close to the policy pattern in the PolicyXpert.

The main screen 301 comprises three frames 311, 321, and 331. The frames are almost the same as the frames divided from a window in a Web browser and used to display different Web pages. The class frame 311 includes a class list 312, a Show button 313, a Delete button 314, an Insert button 315, and a text field 316. The class list 312 displays a list of policy class names and a policy class can be selected from the list using the mouse. The Show button 313 displays contents of a selected policy class in the policy frame 321. The Delete button 314 deletes a selected policy class. The Insert button 315 generates a new empty policy class having a name input to the text field 316.

The policy frame 321 includes a policy list 322, a Show button 323, a Delete button 324, an Insert button 325, a text field 326, and a Show Assignment button 327. The policy list 322 displays a list of policy names belonging to a selected policy class. The operator can select a policy from the list using the mouse. The Show button 323 displays contents of a selected policy class in the policy frame 321. The Delete button 324 deletes a selected policy. The Insert button 325 generates a new empty policy having a name input to the text field 326. The Show Assignment button 327 is pressed to open a window 341 for displaying a list of policy targets.

The rule frame 331 includes a policy rule list 332, an Edit button 333, a Delete button 334, an Insert button 335, and a text field 336. The rule list 332 displays a list of policy rules. The operator can select a policy rule from the list using the mouse. The Edit button 333 opens and displays a new window for editing a policy with respect to the contents of a selected policy. The Delete button 334 deletes a selected policy. The Insert button 335 generates a new empty policy rule having a name input to the text field 336.

The policy target window 341 includes a policy target list 342, an Install button 343, and a Remove button 344. The policy target list 342 lists policy target devices and their names. For example, for a network device, the interface name is displayed here. In addition, in this embodiment, policy agents 215, 216, and 217 are also handled as policy targets, so that those names are also displayed here. The operator can select one or more target devices from the list 342 using the mouse. Each of the policy agents 215, 216, and 217 sends the policy target list 342 to the operator console 211 periodically through the policy manager 212. The operator console 211 displays the reported information in the policy target list 342.

In addition to the above information, the operator console 211 also preferably comprises a window for displaying results of distribution and deletion of policies, as well as error messages.

FIG. 16 and FIGS. 4 through 11 show policies to be input through the operator console 211. The formats and meanings of those policies are described below. The policies are applied through the processing procedures shown in FIGS. 12 to 15. Pairs of policy variables and their values are set as a list in the condition and operation parts of policy rules. This format conforms to the Internet Draft "draft-ietf-policy-pcim-ext-05. text" described above in the Background of the Invention.

Figures 15, 16:
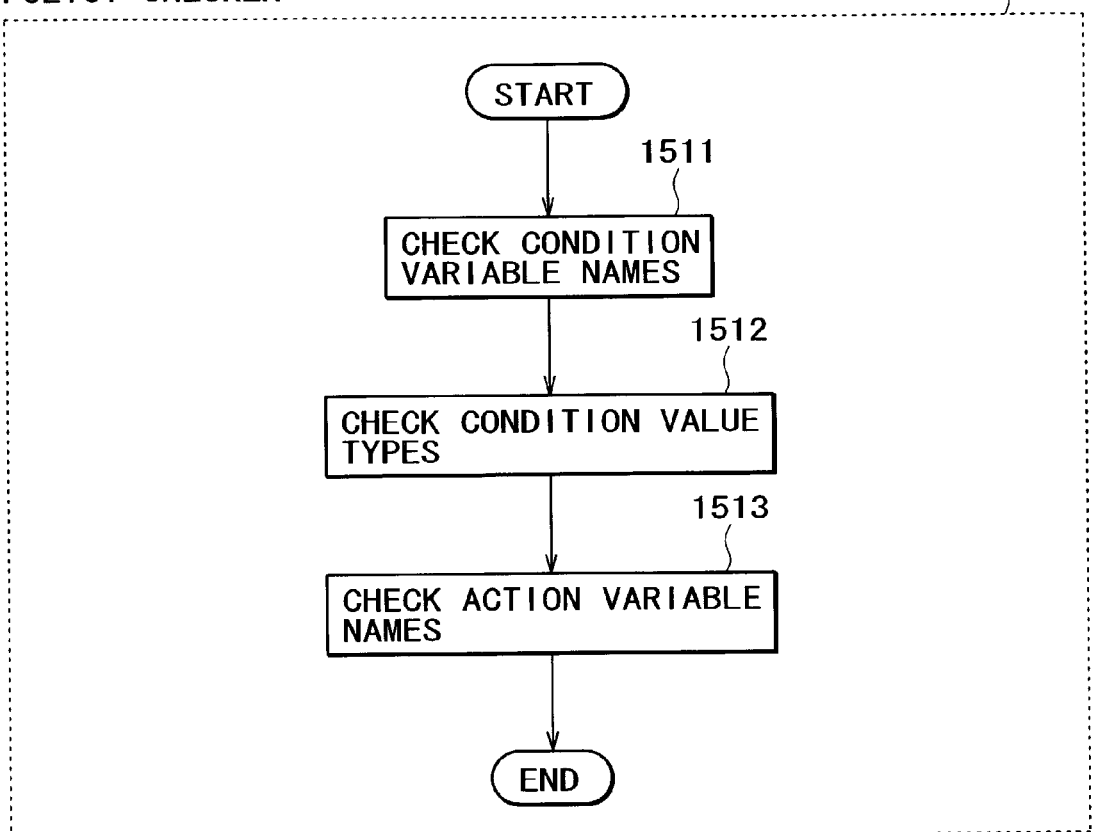
FIG. 15 is a flowchart of the functions performed by a policy checker 1215 located in the policy manager 212 of FIG. 12.
FIG. 16 is a "Policies" policy 1601 to be input to the policy server 112 of FIG. 1.

FIG. 16 shows the contents of a policy belonging to the policy class "PolicyDefinition". The policy rule included in the PolicyDefinition policy (a policy of the PolicyDefinition class) describes a definition of a device-independent policy class. In the PolicyDefinition policy, specified are the name of a policy class to be defined, a list of variable names that may appear in the condition part of the policy rule included in this policy class policy, and a list of variable names that may appear in the action included in the policy class policy. Due to the existence of this PolicyDefinition policy, the policy manager is able to check the policy rule for appearance of any illegal variable name.

FIG. 16 shows a PolicyDefinition policy 1601 used to define policies. A policy header 1602 specifies a target policy name "Policies" and its policy class "PolicyDefinition". The policy class "PolicyDefinition" is pre-installed in the policy server 112.

The policy rule 1611 defines policies of the policy class QoS. The condition part 1612 of the policy rule 1611 specifies a condition: if the value of the variable "name" is "QoS". Namely, "QoS" is to be defined as a policy class name in the condition part 412 with respect to the policy rule 411. (See FIG. 4).

In the action part 1613 of the policy rule 1611, each of the following items is specified. In the policy variable 1614, the value of a policy variable "condition_variables" is specified as a list consisting of one value 'user_class'. The policy variable 1614 specifies a policy variable name that can be specified in the condition part of a policy class QoS policy ("the QoS policy"). In other words, the QoS policy condition part can specify only a policy variable named as 'user_class'.

The condition variable 1615 specifies the value of a policy variable named 'action_variables' id a list consisting of one value 'access'. The policy variable 1615 specifies a policy variable name that can be specified in the action part of a QoS policy. In other words, the action part of the QoS policy can specify only a policy variable named 'access'.

FIGS. 4 through 6 show contents of a policy of the policy class "PolicyToCommand". The policy rule included in the PolicyToCommand describes a device dependent translation method that translates a policy belonging to a specified policy class to a command. In the PolicyToCommand policy, specified are a name of a subject policy, a method description (filler) for filling both template and template parameters (variable part) of a command sequence generated from a policy rule of a policy, an initialization processing to be performed before the command sequence generation, a template of the command sequence to be generated before and after a processing corresponding to the policy rule and its filler, and an initialization processing to be performed before a processing corresponding to the policy rule.

FIG. 4 shows items of a "SwitchCommands" policy 401 used to translate a policy to a command sequence for the LAN switch 121. The policy header 402 specifies a policy name "SwitchCommands" and its policy class "PolicyToCommand". The policy class PolicyToCommand is pre-installed in the policy server 112.

The policy rule 411 defines a method for translating a policy class 'QoS' policy to a command sequence. The condition part 412 of the policy rule 411 specifies: if the variable "name" is "QoS", i.e., the condition part 412 specifies that the policy class name to be defined in the policy rule 411 is "QoS".

The action part 413 of the policy rule 411 specifies the following items. The policy variable 417 specifies a list of two elements: a "Table" and a group consisting of five values: "InterfaceTable[Interface]", "ICC", "dontCare", "ACL", and "1". The "policy_installation_epilogue" value describes a method for generating a command sequence used to perform a post-processing after the end of the distribution of all the policy rules belonging to the QoS policy at the time of QoS policy distribution. The "InterfaceTable" specifies a LAN switch hardware table to which a QoS policy is to be distributed. The "Interface" in InterfaceTable[Interface] specifies a device interface number "I" to which the QoS policy applies. Consequently, the InterfaceTable[Interface] means an (i)$^{th}$ element of the InterfaceTable. The Interface value is obtained by an agent that has received the distributed policy rule 411 as a result of its reference to the target device. The "ICC" specifies a format in which "dontCare", "ACL", and "1" values are stored in the InterfaceTable. In other words, the first two bytes are kept as they are and the "ACL" local variable value (access list number) is stored in the following one byte. Then, "1" is stored in the succeeding one byte. The "dontcare" has no value to be stored; it denotes that no value is to be stored.

The (i)$^{th}$ element of the "InterfaceTable" is used to control the (i)$^{th}$ device interface while it depends on the specifications of the LAN switch 121. The value to be stored in the third byte denotes an element number of the "AccessControlTable" and the access control or QoS control represented by the element of the "AccessControlTable" is employed for the target interface. The "AccessControlTable" specifies a LAN switch hardware table to which a QoS policy is to be distributed. The value stored in the fourth byte denotes the validity of the target element of the "InterfaceTable". In other words, when "0" is stored, the element is invalid. When another value is stored, the element is valid. The "1" stored in the policy variable field 417 thus denotes that the element is valid.

The policy variable 418 specifies a value of a policy variable "policy_removal_prologue" is a list of two elements: a "Table" and a group consisting of five values: "InterfaceTable[Interface]", "ICC", "dontCare", "ACL", and "0". The "policy_removal_prologue" value, when a QoS policy is deleted, describes a method for generating a command sequence used for a pre-processing to be performed after all the policy rules belonging to the QoS policy are deleted. The policy variable 418 is the same as the policy variable field 417 except that the value stored in the fourth byte is not 1, but 0. In other words, the policy variable 418 specifies invalidation of the target element in the "InterfaceTable".

The policy variable 416 specifies a value of a policy variable "rule_initialization", which comprises a pair of a values: {ACL=list_number('ACL', 0, 1023)}, i.e., an ACL variable name and a function "list_number('ACL', 0, 1023)". The policy variable 416 means that, when a QoS policy is translated to a command, the local variable (a work variable used for translation) named as ACL is translated to a value obtained as a result of calling a function "list_number('ACL', 0, 1023)".

The policy variable 419 specifies a value of a policy variable "rule_installation_commands" is a list of two elements: a "Table" and a group of six values: "AccessControlTable [ACL]", "CCIL", "1", "condition('access')=='deny'?0: condition('access')=='permit'|condition('access')=='low_priority'?1: condition('access')=='high_priority'?2)", "dontCare", and "condition('user_class')||0]]". The "rule_installation_commands" value describes a method for generating a command sequence used to distribute a QoS policy rule. In "AccessControlTable[ACL]", the ACL specifies a local variable value and "AccessControlTable[ACL]" specifies an element of the "AccessControlTable", specified by the value.

The "CCIL" specifies a format in which the succeeding elements in the above list are stored in the "AccessControlTable". In other words, 1 is stored in the first one byte. Then, 0, 2, or 2 is stored in the next one byte according to the value of the policy variable "access" to appear in the condition part of a QoS policy rule. At this time, the second byte value is determined as follows. The value in the succeeding two bytes is not changed. In the succeeding eight bytes, if a policy variable "user_class" is set in the condition part of the QoS policy rule, an eight-byte value obtained by applying a policy "SwitchValueTranslation" 801 to the policy variable value is stored. If not, 0 is stored there. If the policy variable "access" value is 'deny', 0 is set. If the value is any of 0, 'permit', and 'low_priority', 1 is stored. If the value is 'high_priority', 2 is stored.

The policy variable 420 specifies a value of a policy variable "rule_removal_commands" is a list consisting of only one element, which is a list of four values: "AccessControlTable[ACL]", "CC", "0", and "0". The "rule_removal_ commands" value describes a method for generating a command sequence that deletes a QoS policy rule. The "ACL" in the "AccessControlTable[ACL]"denotes a local variable value and the "AccessControlTable[ACL]" denotes an "AccessControlTable" element specified by the value. The "CC" denotes a format in which the succeeding elements in the above list are stored in the "AccessControlTable". In other words, 0 is stored in the first byte and in the succeeding one byte respectively.

FIG. 5 shows contents of a "ServerCommands" policy 501 that defines policies in the servers 131 and 132. The policy header 502 specifies both of the policy name "ServerCommands" and its policy class "PolicyToCommand".

The policy rules 511 define a method for translating a QoS policy to a command sequence. The condition part 512 of the policy rule 511 specifies a condition: if the variable "name" value is "QoS", i.e., the condition part 512 specifies that the policy class name to be defined in the policy rule 511 is "QoS".

The action part 513 of the policy rule 511 specifies the following contents. The policy variable 516 specifies a value of a policy variable "rule_installation_commands" as a list of two elements: a "CLI" and a group consisting of four values: "allocate-servers % s % s", "condition('user_class')", "action ('access')=='deny'?0%: action('access')=='permit'| action ('access')=='low_priority'?20% action('access')=='high_priority'?50%", and "condition('user_class')||0]]". The "rule_installation_commands" value describes a method for generating a command sequence used to distribute a QoS policy rule.

The first element CLI in the above list specifies that the contents of the list are used to generate a command in a command-line interface. The second element "allocate-servers % s % s" specifies a template for a command to be generated. In other words, the above list generates an allocate-servers command having two parameters. Each parameter value is determined by the two succeeding elements in the list. Namely, the first parameter is assumed as a result of application of the policy "ServerValueTranslation" 901 to the value of the policy variable "user_class" to appear in the condition part of the subject policy. The second parameter is assumed to be 0% when the value of the policy variable "access" to appear in the action part of the subject policy rule is 'deny', 20% when the value is 'permit' or 'low_priority', and 50% when the value is 'high_priority'.

The policy variable 517 specifies a value of a policy variable "rule_removal_commands" is a list of two elements; a "CLI" and a group consisting of three values: "allocate-servers % s % s", "condition('user_class')", and "default". The "rule_removal_commands" value describes a method for generating a command sequence used to delete a QoS policy rule.

The first element CLI in the above list specifies that the contents of the list are used to generate a command in a command-line interface. The first item "allocate-servers % s % s" in the second group above specifies a template for a command to be generated. In other words, the above list generates an "allocate-servers" command having two parameters. Each parameter value is determined by the two succeeding elements in the list. Namely, the first parameter is assumed as a result of application of the policy "ServerValue Translation" 901 to the value of the policy variable "user_ class" to appear in the condition part of the subject policy. The second parameter is assumed as a character string "default".

Depending on the specifications of the subject server, the "allocate-servers" command specifies the number of such resources as the CPU time of the servers 131, 132 to be allocated to a specific user. In other words, the command "allocate-servers User 50%" specifies 50% allocation of each resource to the user named as "User".

FIG. 6 shows items of a "StorageCommands" polity 601 used to define policies for the storage devices 150 to 152. The policy header 602 specifies a policy name "StorageCommands" and its policy class "PolicyToCommand".

The policy rule 611 defines a method for translating a QoS policy to a command sequence. The condition part 612 of the policy rule 611 specifies a condition: if the value of the variable "name" is "QoS", i.e., the condition part 612 specifies that the policy name to be defined in the policy rule 611 is "QoS".

The action part 613 of the policy rule 611 specifies the following items. The policy variable 616 describes a value of a policy variable "rule_installation_commands" is a list of three values: "MIB", "set(storage_mib.caching.unit, condition('user_class'))", "set(storage_mib.caching.strategy", and "action('access')=='deny'|: action('access')=='permit'| action('access')=='low_priority'? 'nocache': action('access')=='high_priority'? 'cache')]". The "rule_installation_ commands" value describes a method for generating a command sequence used to distribute a QoS policy rule.

The first element "MIB" in the above list specifies that the contents of the list are used to generate a command in an SNMP interface. The second and third elements in the list specify templates for commands to be generated. In other words, the list generates two configuration commands and the two elements of the MIB are set in the commands. Those two configuration commands are used to specify that a target database/file is cached or not cached. In other words, the first configuration command specifies a target file to be cached and the second configuration command specifies whether the file is to be cached ('cache') or not cached ('nocache'). A parameter of the first configuration command is a result of an application of the policy StoreValueTranslation 1001 to the policy variable "user_class" value to appear in the condition part of the subject policy rule. 'Nocache' is set as a parameter of the second configuration command when the value of the policy variable access to appear in the action part of the subject policy rule is 'deny', 'permit', or 'low_priority'. 'Cache' is set when the value is 'high_priority'.

The policy variable 617 specifies a value of a policy variable "rule_removal_commands" is a list of three values: "MIB", "set(storage_mib.caching.unit, condition('user_ class'))", and "set(storage_mib, caching.strategy, 'nocache')]". The "rule_removal_commands" value describes a method for generating a command sequence used to delete a QoS policy rule. The first element "MIB" in the above list specifies that the contents of the list are used to generate a command in an SNMP interface. The second and third elements in the list specify templates for commands to be generated. In other words, the list generates two configuration commands and the two elements of the MIB (Management Information Base) are set in those commands. Those two configuration commands specify whether to cache a database/file.

FIG. 7 shows items of a policy belonging to a policy class PolicyVariableDefinition. The policy rule included in the PolicyVariableDefinition policy appears in the policy rule condition part. The condition part specifies both of type and list to be taken by a policy variable having a specified name.

FIG. 7 shows items of a "VariableDefinition" policy 701 used to specify a value type to be taken by a policy variable. The policy header 702 specifies a policy name "VariableDefinition" and its policy class "PolicyVariableDefinition".

The policy rule 711 specifies a value type to be taken by the policy variable "user_class". The condition part 712 of the policy rule 711 specifies a condition: if the value of the variable "name" is "user_class", i.e., the condition part 712 specifies that the policy variable name to be defined in the policy rule 711 is "user_class".

The action part 713 of the policy rule 711 specifies a value of a policy variable "value_type" is a list consisting of only one value: 'user_class'. This means that only the 'user_class' type defined in policies "SwitchValueTranslation" 801, "ServerValueTranslation" 901, and "StorageValueTranslation" 1001 are usable as the "user_class" value in the policy rule that uses the "user_class" policy variable.

FIGS. 8 through 10 show items of a policy belonging to the policy class "PolicyValueTranslation". The policy rule included in the "PolicyValueTranslation" appears in the condition part of the policy rule. The condition part describes a device dependent method for translating a value of a policy variable having a specified name to a value used for a command obtained by translating a policy rule.

FIG. 8 shows items of a "SwitchValueTranslation" policy 801 used to translate a policy variable to a command sequence in accordance with a LAN switch to which a policy is to be distributed. The policy header 802 specifies a policy name "SwitchValueTranslation" and its policy class "PolicyValueTranslation".

The policy rule 811 defines a method for translating a "user_class" type value to a command sequence. The condition part 812 of the policy rule 811 specifies a condition: if the value of the variable "name" is "user_class", i.e., the condition part 812 specifies that the value type that defines a translation method in the policy rule 811 is "user_class".

The action part 813 of the policy rule 811 specifies that the policy variable "result" takes one value: "value=='Sales'? 10.1.0.0/255.255.0.0 :value='Development'? 10.2.0.0/255.255.0.0". This means that an 8-byte value is assumed as a translated value if the value to be translated is 'Sales'. The 8-byte value is obtained by connecting an IP address 10.1.0.0 to a mask 255.255.0.0 (that is, an IP address and a mask of the Sales Dept.). When the value to be translated is 'Development', an 8-byte value obtained by connecting an IP address 10.2.0.0 to a mask 255.255.0.0 (that is, the IP address and the mask of the Development Dept.) is assumed as a translated value.

FIG. 9 shows items of a "ServerValueTranslation" policy 901 used to translate a policy variable value to a command sequence in accordance with the server to which a policy is to be distributed. The policy header 902 specifies a policy name "ServerValueTranslation" and its policy class "PolicyValueTranslation".

The policy rule 911 defines a method for translating a "user_class" type value to a command sequence. The condition part 912 of the policy rule 911 specifies a condition: if the value of the variable "name" is "user_class", i.e., the condition part 912 specifies that a value type that defines the translation method in the policy rule 911 has a name "user_class".

The action part 913 of the policy rule 911 specifies that the policy variable "result" takes one value: "value=='Sales'? Userid(['Mike', 'Cindy', 'Dick']) :value=='Development'? Userid(['Nancy', 'Bob', 'Bill'])". This means that the translated value becomes "Userid('Mike', 'Cindy', 'Dick')" (that is, the user ID of a user in the Sales Dept.) if the value to be translated is 'Sales' and "Userid('Nancy', 'Bob', 'Bill')" (that is, a user ID of the user in the Development Dept.) if the value to be translated is 'Development'.

FIG. 10 shows items of a "StorageValueTranslation" policy 1001 used to translate a policy variable value to a command sequence in accordance with a target storage to which a policy is to be distributed. The policy header 1002 specifies the policy name "StorageValueTranslation" and its policy class "PolicyValueTranslation".

The policy rule 1011 defines a method for translating a "user_class" type value. The condition part 1012 of the policy rule 1011 specifies a condition: if the value of the variable "name" is "user_class". I.e., the condition part 1012 specifies that the type of the value that defines a translation method in the policy rule 1011 has a name "user_class".

The action part 1013 of the policy rule 1011 specifies that the value of the policy variable "result" takes one value: "value=='Sales'? SalesDB) :value=='Development'? ProductDB)". This means that the translated value becomes 'SalesDB' (that is, the database file name or disk volume name used by the Sales Dept.) if the value to be translated is 'Sales' and 'ProductDB' (that is, a database file name or disk volume name used by the Development Dept.) if the translated name is 'Development'.

FIG. 11 shows a definition of a QoS policy in accordance with the policy definition shown in FIG. 16 and FIGS. 4 through 10. In other words, a QoS policy 1101 used to give priority to the Sales Dept. using the system of Corporation X by applying the QoS policy to the LAN switch 121, the servers 131 and 132, and the storage devices 150 to 152. The policy header 1102 specifies a policy name "PrioritizeMarketing" and its policy class "Qos".

The policy rule 1111 specifies that transactions of the Sales Dept. take precedence over those of the Development Dept. every morning between 9 and 10 AM. In other words, the condition part 1112 of the policy rule 1111 specifies a first condition that specifies the policy rule 1111 applies between 9 and 10 a.m. and the "user_class" to which the policy rule 111 applies is Sales Dept. ('Sales'). The action part 1113 of the policy rule 1111 specifies that priority is given to transactions ('high_priority').

Figure 13A:
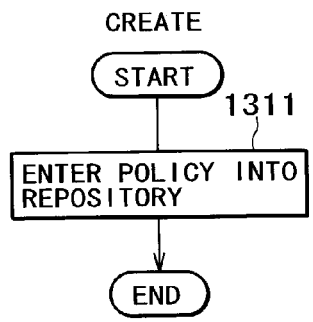
FIGS. 13A to 13D are flowcharts of the functions performed by the policy manager 212 of FIG. 12.

Hereinafter, a configuration and a processing procedure of the policy manager 212 will be described with reference to FIGS. 12 through 14.

FIG. 12 shows a block diagram of the policy manager 212. The policy manager 212, when receiving a request from the operator console 211 through the upper layer receiver 1211, passes the request to the manager controller 1212. The policy manager 212, receiving the result from the manager controller 1212, returns the received result to the operator console 211 through the upper layer receiver 1211. The request type issued from the operator console 211 at this time is any of the following.

create(name, body), delete(name), get(name), install (name, target), and remove(name, target).

The "name" is the name of an entity, that is, a policy class or policy rule. The "body" is the name of an entity body. The "target" is the name of a policy target device. Sometimes, there are a plurality of entity targets and a plurality of policy targets. Although there is no request type for updating included in the above types, updating is realized by overwriting an existing definition or using "delete" to delete an existing definition, then using "create" to define the target again.

When "name" does not include ":", it denotes a policy class name. When "name" includes one ":", it signifies that a policy class name and a policy name are connected to each other with the ":" therebetween. When "name" includes two ":s", it signifies that a policy class name, a policy name, and a policy rule are connected to each other with the ":s" therebetween, respectively. In other words, the above interface can generate/delete an entity of any type of policy class, policy, and policy rule.

The functions of the processing method will now be described immediately below, while the processing method for those requests will be described. below. The "create" request requests a function for generating an entity having a specified name (name), registering the entity in the policy repository 213, and storing the entity in the database placed in the policy manager/agent. The "delete" request requests a function for deleting an entity having a specified name from the policy repository 213 and the database placed in the policy manager/agent. The "get" request requests a function for taking out an entity having a specified name from the policy repository 213. The "install" request requests a function for applying a policy having a specified name to a specified target device. The "remove" request requests a function for deleting a policy having a specified name from a specified policy target device.

The "install" requests are classified into two types: those related to server policies and those not related to server policies. When an "install" request is of the former type, a server policy compiler 1213 is used to translate the information format to the internal format, then the request is registered in the server policy database 1214, which is located in the policy manager 212. When an "install" request is of the latter type, the subject polity is checked according to the information registered in the server policy database 1214, then sent to the target agent through the mid layer sender 1216.

Next, a method for processing requests from the operator console 211 in the manager controller 1212 will be described with reference to FIGS. 13A to 13D. FIG. 13A describes a method for processing a "create" request. When a "create" request is received from the upper layer receiver 1211, the manager controller 1212 registers the entity in the policy repository 213 in step 1311. In other words, the controller 1212 registers the entity using the entity name as a key and the body as a value. When a policy class and a policy are registered, the entity body is empty. A policy rule is registered together with the policy rule body. The controller 1212 then terminates the function as shown in FIG. 13A.

Figure 13B:
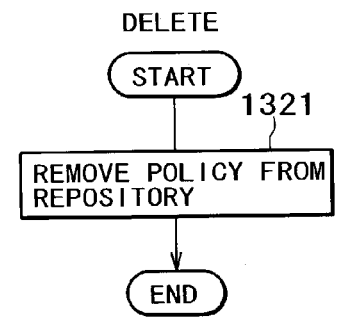
Figure 14:
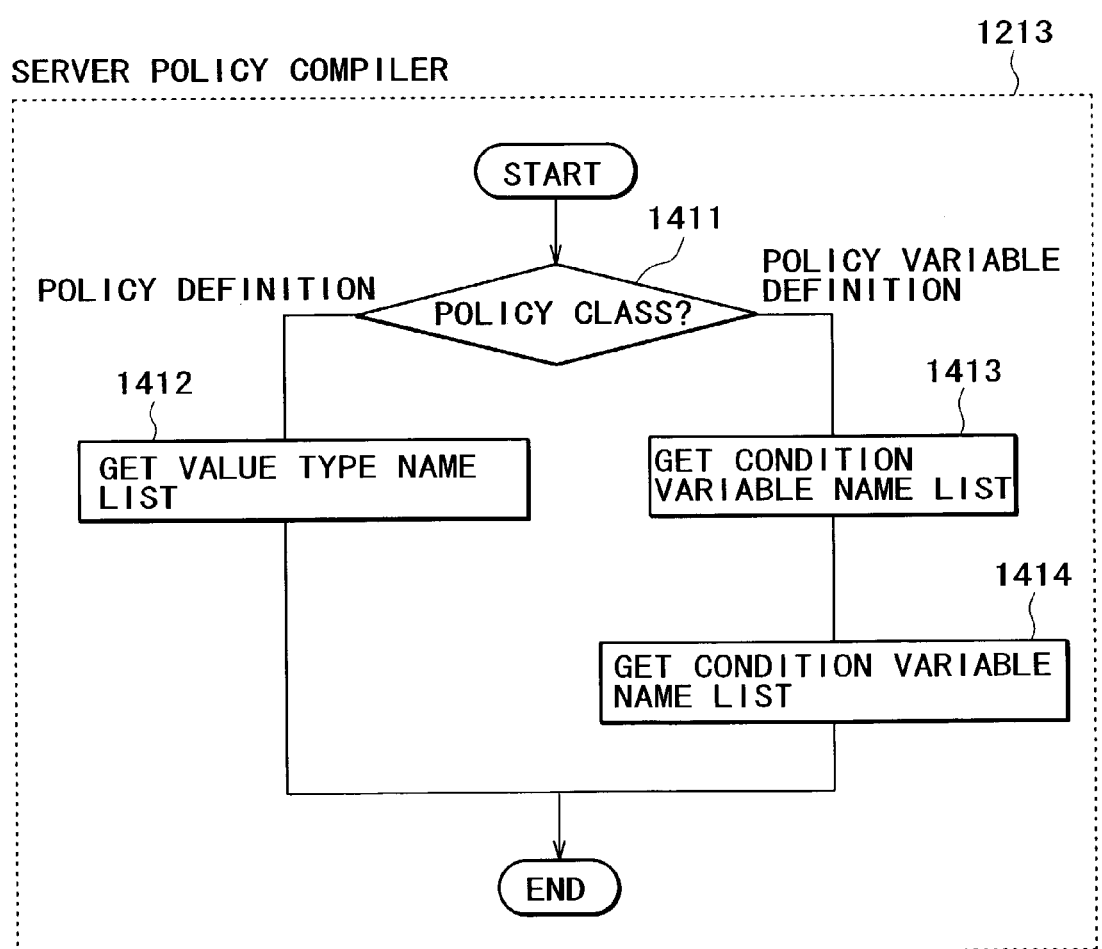
FIG. 14 is a flowchart of the functions performed by a server policy compiler 1213 located in the policy manager 212 of FIG. 12.

FIG. 13B shows a method for processing a "delete" request. When a "delete" request is received from the upper layer receiver 1211, the controller 1212 deletes the entity from the policy repository 213 using its name as the key in step 1321. The controller 1212 thus terminates the function as shown in FIG. 13B.

Figure 13C:
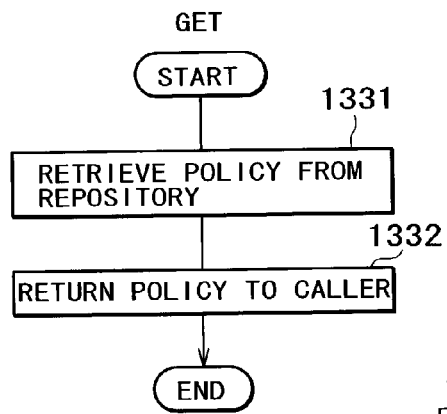

FIG. 13C shows a method for processing a "get" request. When a "get" request is received from the upper layer receiver 1211, the controller 1212 searches the target entity in the policy repository 213 using its name as a key in step 1331. In step 1332, the controller 1212 calls the entity body and returns it to the call source, then terminates the function as shown in FIG. 13C.

Figure 13D:
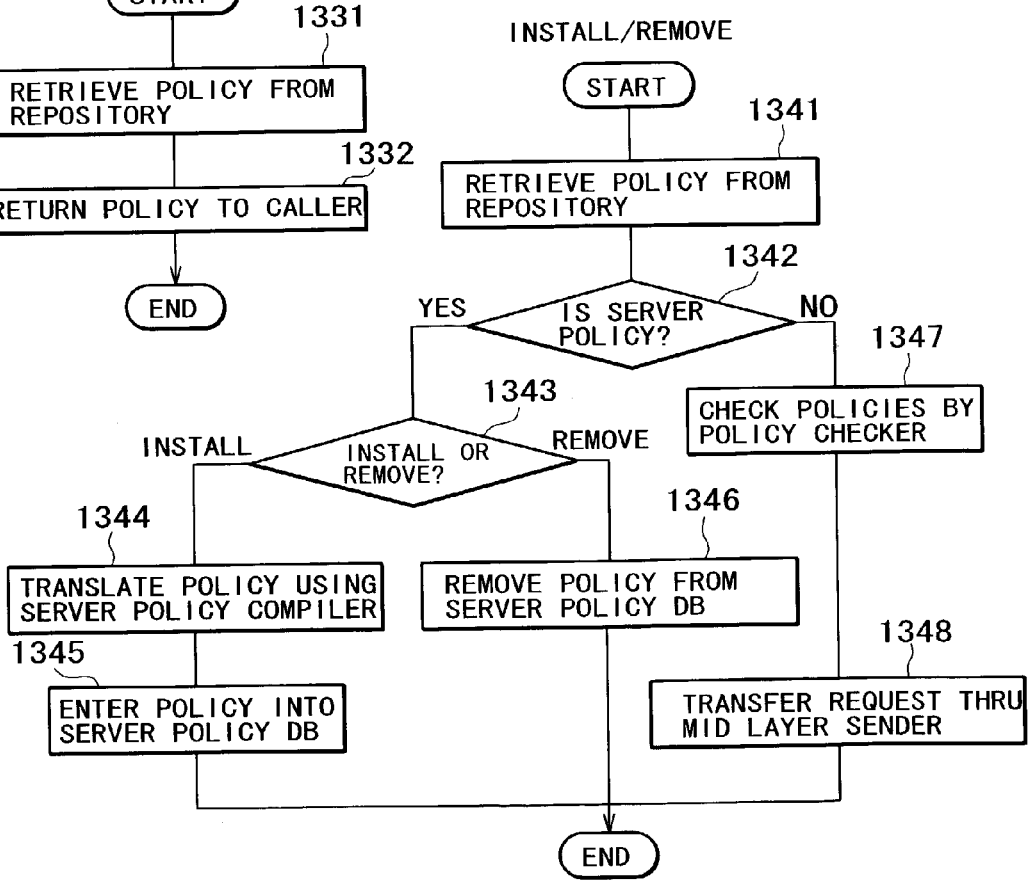

FIG. 13D shows a method for processing an "install" request and a "remove" request. When an "install" or "remove" request is received from the upper layer receiver 1211, the controller 1212 searches the target entity in the policy repository 213 using its name as a key in step 1341. The controller 1212 then determines whether or not the entity is a server policy in step 1342. The server policy is a policy that affects the operation of the subject server. A PolicyDefinition policy and a PolicyVariableDefinition policy are such server policies. When the entity is a server policy, the controller 1212 goes to step 1343. Otherwise, the controller 1212 goes to step 1347.

In step 1343, the controller 1212 determines whether the request is "install" or "remove". When it is an "install" request, the controller 1212 goes to step 1344. When it is a "remove" request, the controller 1212 goes to step 1346. In step 1344, the controller 1212 calls the server policy compiler 1213 to translate the target policy (entity) to be installed. In step 1345, the controller 1212 stores the result, that is, a pair or two pairs of keys and values in the server policy database 1214 and terminates the function as shown in FIG. 13D. The server policy database 1214 can record pairs of keys and values of character strings. For example, the database 1214 can employ a hash table just like the GNU database manager (GDBM). In step 1346, the controller 1212 deletes the target policy from the server policy database 1214, then terminates the function as shown in FIG. 13D.

In step 1347, the controller 1212 calls the policy checker 1215 to determine the validity of the target policy; this is only when a policy is to be distributed. The controller 1212 sends the entity body searched in the policy repository 213 to the agent that manages the policy target specified by the request, together with the request type (install or remove) and the entity name through the mid layer sender 1216, then terminates the function as shown in FIG. 13D.

Next, the processing procedure of the server policy compiler 1213 will be described with reference to FIG. 14. When the server policy compiler 1213 is started up, it determines, in step 1411, the policy class input. When the policy class is "PolicyDefinition", the compiler 1213 goes to step 1412. When the policy class is "PolicyVariableDefintion", the compiler 1213 goes to step 1413.

In step 1412, the compiler 1213 adds a character string ":type" to the policy variable name (the value of the policy variable "name") whose value is defined in the condition part of the input policy so as to generate a key used for registering a value type list in the server policy database 1214. For example, when the policy variable name is "user_class", the compiler 1213 generates a key "user_class:type". Then, the compiler 1213 takes out a value type list (the value of the policy variable "value_type") whose values are defined in the action part, then registers the data.

In step 1413, the compiler 1213 adds a character string ":condition" to the policy class name (the value of the policy variable "name") whose value is to be defined in the condition part of the input policy so as to generate a key used for registering a condition part policy variable list in the server policy database 1214. For example, when the policy variable name is "QoS", the compiler 1213 generates a key "QoS:condition". The compiler 1213 then takes out the value of the policy variable "condition_variable", which is to be defined in the action part to register the data in a condition part policy variable list.

In step 1414, the compiler 1213 adds a character string ":action" to the policy class name (the value of the policy variable "name") whose value is to be defined in the condition part of the input policy so as to generate a key used for registering an action part policy variable list in the server policy database 1214. For example, when the policy variable name is "QoS:action", the compiler 1213 generates a key "QoS:action". The compiler 1213 then takes out the value of the policy variable "action_variable", which is to be defined in the action part so as to register the data in an action part policy variable list.

Next, a processing procedure of the policy checker 1215 will be described with reference to FIG. 15. When the policy checker 1215 is started up, the checker 1215 checks every policy variable name whose value is to be defined in the condition part of the input policy. In other words, the checker 1215 takes out a policy variable name list from the server policy database 1214 using a key obtained by adding a character string consisting ":condition" to the target policy class name, then checks whether or not the target policy variable name is included in the list. If any variable name is not included in the list, the checker 1215 returns an error message to the operator console 211.

In step 1512, the checker 1215 checks whether or not the type of every value to be defined in the condition part of the inputted policy is usable for the corresponding variable name. In other words, the checker 1215 takes out a value type list from the server policy database 1214 using a key obtained by adding a character string consisting ":type" to the target policy variable name, then checks whether or not the target value type is included in the list. If any value type is not included in the list, the checker 1215 returns an error message to the operator console 211.

In step 1513, the checker 1215 finally checks every policy variable name included in the action part of the inputted policy. In other words, the checker 1215 takes out a policy variable name list from the server policy database 1214 using a key obtained by adding a character string consisting ":action" to the target policy class name so as to check whether or not each policy variable name of the target policy is included in the list. If any variable name is not included in the list, the checker 1215 returns an error message to the operator console 211.

Figure 17:
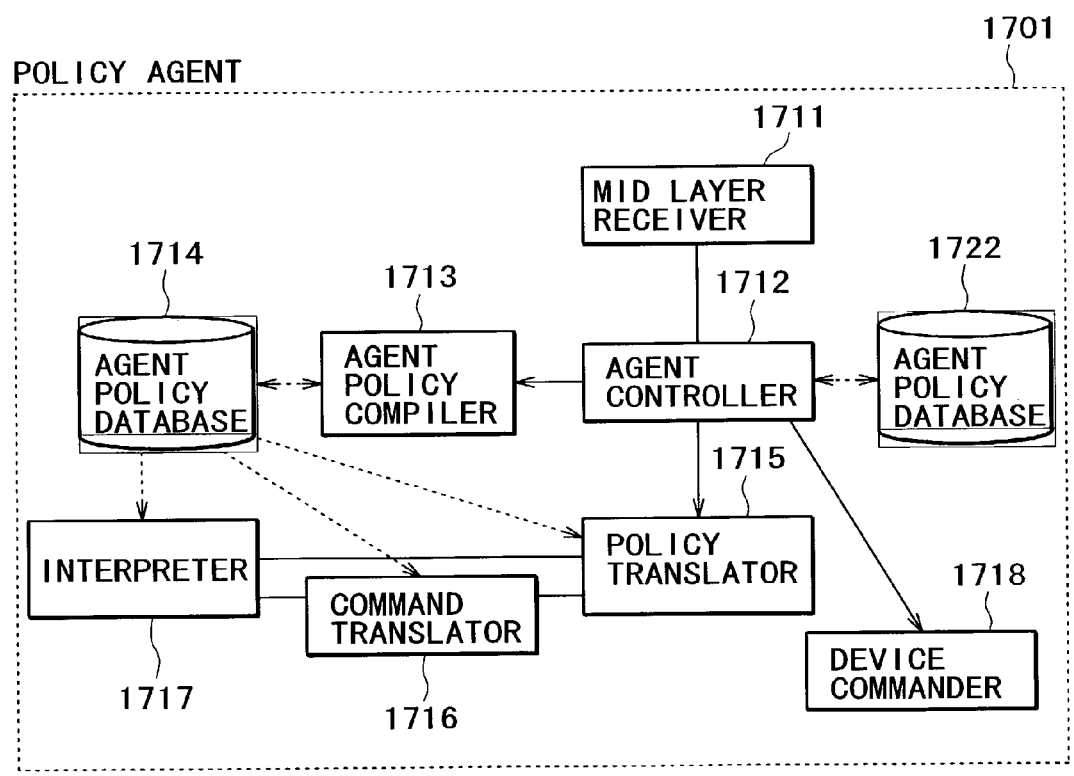
FIG. 17 is a block diagram of policy agents 215, 216, 217 of FIG. 2.

FIG. 17 shows a configuration of the policy agents 215, 216 and 217. The network agent 215, the server agent 216, and the storage agent 217 are all the same in configuration. Each of the policy agents 215 to 217, when receiving a request from the policy manager 212 through the mid layer receiver 1711, transfers the request to the agent controller 1712 and obtains the processing result from the agent controller 1712. The policy agent then returns the result to the policy manager 212 through the mid layer receiver 1711. The request to be received from the policy manager 212 is any of the following.

"install(name, target)" and "remove(name, target)"

The "name" is the name of an entity, that is, a policy class, a policy, or a policy rule. The "target" is the name of a target device to which a policy is applied. Sometimes, an entity/policy target is applied to a plurality of targets.

The "install" requests are classified into two types: "install" related to an agent/policy and "install" not related to any agent/policy. For the former "install", the agent policy compiler 1713 is used to translate the information in the internal format. The result is then registered in the agent policy database 1714, which is provided in each of the policy agents 215, 216, and 217. For the latter "install", the policy is translated in the policy translator 1715 according to the information registered in the agent policy database 1714, then sent to the target agent through the device commander 1718. While the policy translator 1715 translates the target policy completely, the command translator 1716 is called for each command sequence to be generated. In addition, the command translator 1716 passes an expression to be evaluated to the interpreter 1717 to find the value.

Figure 18:
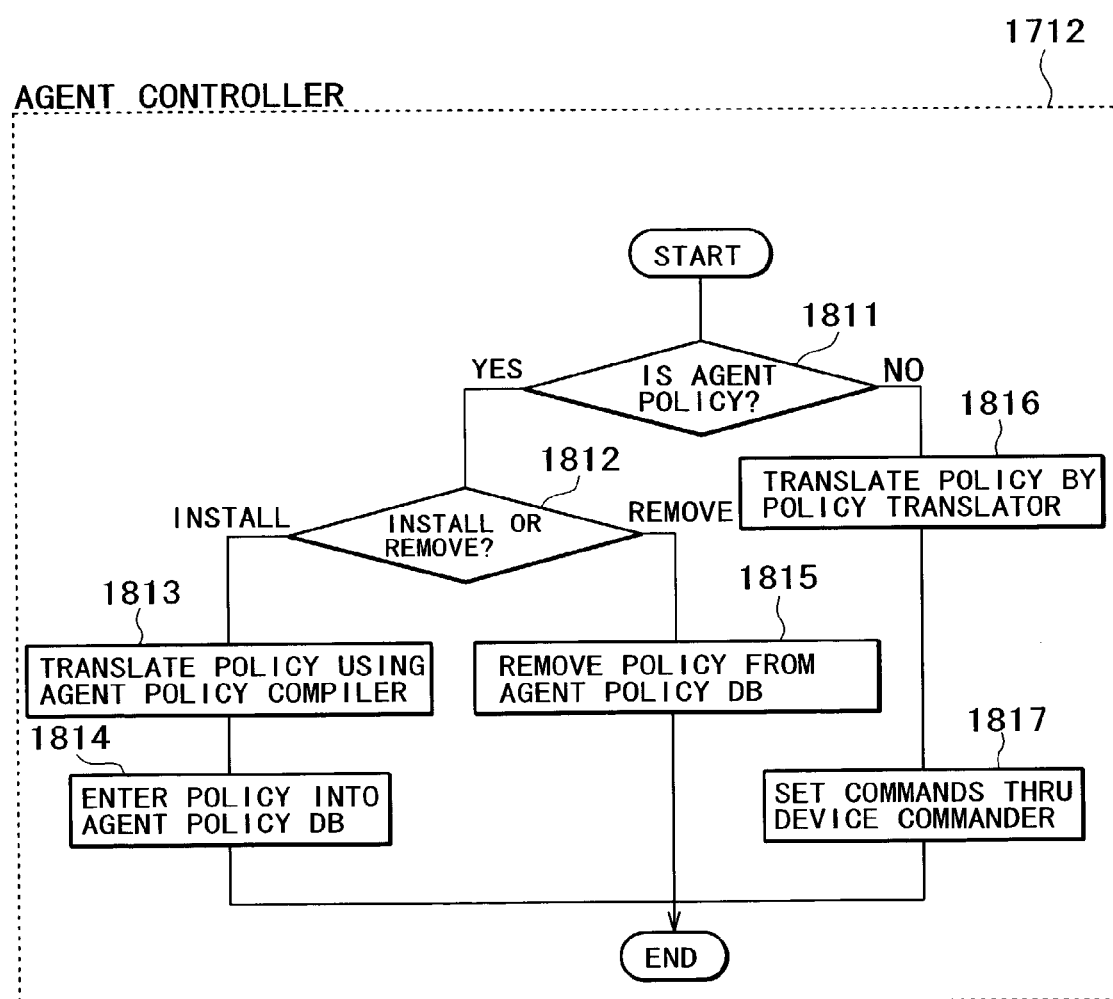
FIG. 18 is a flowchart of the functions performed by a policy agent 1701 of FIG. 17.

Next, the manner in which a request is processed in each of the network agent 215, the server agent 216, and the storage agent 217 will be described with reference to FIG. 18. The requests to be received by each of the agents 215, 216, and 217 are "install" and "remove". When an install or remove request is received from the mid layer receiver 1711, the agent determines, in step 1811, whether or not the entity is an agent policy. An agent policy is a policy that affects the operation of the target agent. In this case, "PolicyToCommand" and "PolicyValueTranslation" are such agent policies. When the entity is an agent policy, the agent goes to step 1812. Otherwise, the agent goes to step 1816.

In step 1812, the agent determines whether the request is "install" or "remove". When it is an "install" request, the agent goes to step 1813. When it is a remove request, the agent goes to step 1815. In step 1813, the agent changes the policy format through the agent policy compiler 1713 so that the policy is used in the agent controller 1712. Then, in step 1814, the agent stores the result, that is, a pair or a plurality of pairs of keys and values in the agent policy database 1714, then terminates the function as shown in FIG. 18. In step 1815, the agent deletes the target policy from the agent policy database 1714, then terminates the function as shown in FIG. 18.

In step 1816, the agent calls the policy translator 1715 to translate the policy to a command; the policy translator 1715 is called only when a policy is to be distributed. The agent then sets the obtained command as a policy target specified by the request through the device commander 1718, then terminates the function as shown in FIG. 18.

Figure 19:
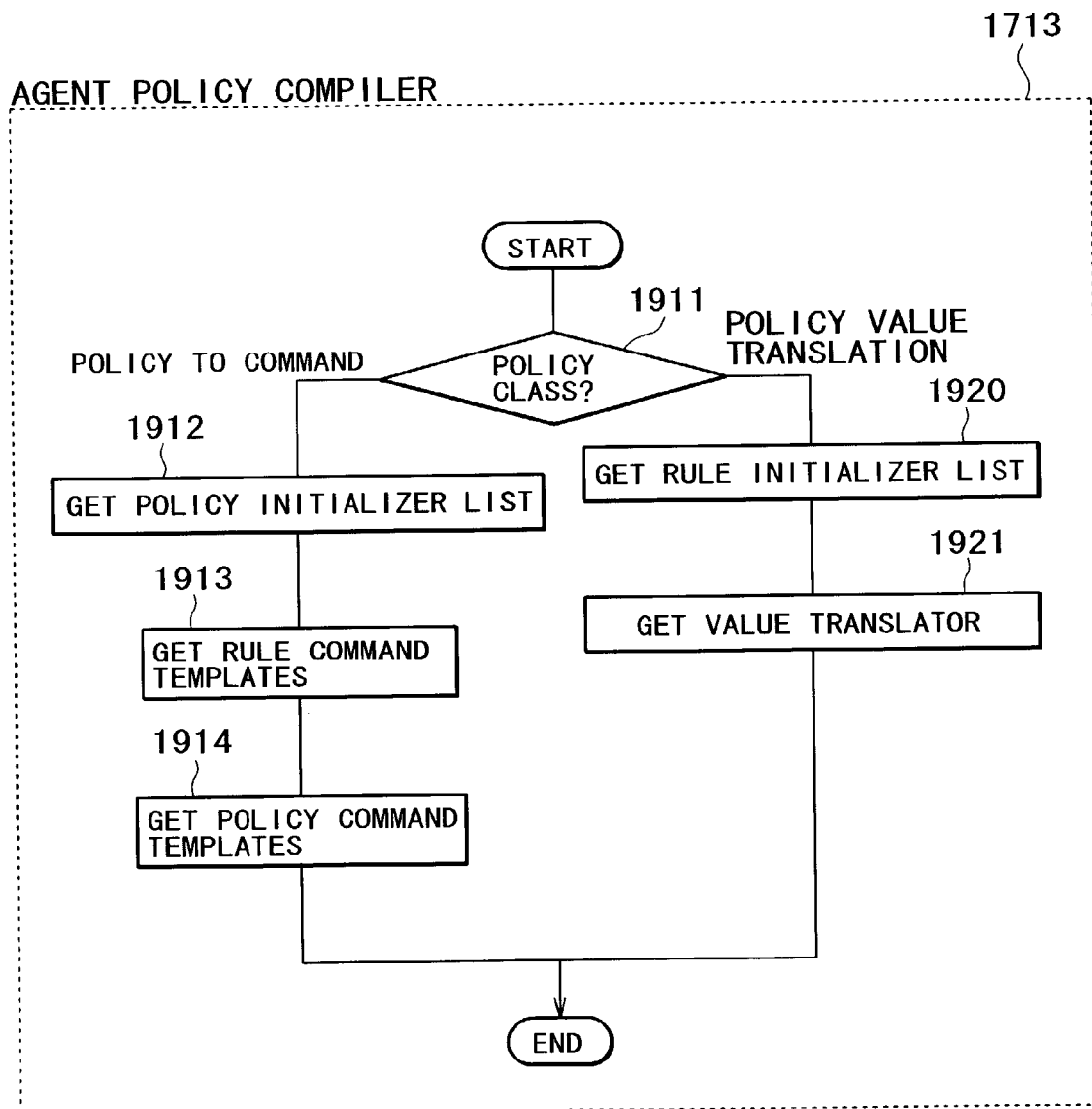
FIG. 19 is a flowchart of the functions performed by an agent policy compiler 1713 located in the policy agent 1701 of FIG. 17.

Next, a processing procedure of the agent policy compiler 1713 will be described with reference to FIG. 19. When the compiler 1713 is started up, the compiler 1713 determines, in step 1911, the policy class of the policy input. When it is a "PolicyToCommand" policy, the compiler 1713 goes to step 1912. When it is a "PolicyValueTranslation" policy, the compiler 1713 goes to step 1920.

In step 1912, the compiler 1713 adds a character string ":policy_init" to the policy class name (the value of the policy variable) included in the condition part of the inputted policy so as to generate a key used for registering an initializer list in the agent policy database 1714 at the policy translation starting time. For example, when the policy class name is "QoS", the compiler 1713 generates a key "QoS:policy_init". The compiler 1713 then takes out values (a list of pairs of local variables and their initial values) corresponding to the policy variable "policy_initialization" set in the action part and registers it in the list.

In step 1913, the compiler 1713 prepares for registering two pairs of templates and template fillers in the agent policy database 1714. The two pairs of templates used for initialization and termination are generated at the time of distribution and deletion of a policy rule included in a policy whose translation method is defined by the inputted policy. In other words, firstly, the compiler 1713 adds a character string ":installation" to the policy class name (the value of the policy class "name") included in the condition part of the policy so as to generate a key used for registering a policy rule distribute command list in the agent policy database 1714. For example, when the policy variable name is "QoS", the compiler 1713 generates a key referred to as "QoS:installation". The agent then takes out the value of the policy variable "rule_installation_commands" from the action part to register it in the policy rule distribution list.

Secondly, the compiler 1713 adds a character string ":removal" to the policy class name (the value of the policy variable "name") included in the condition part of the policy so as to generate a key used for registering a policy rule delete command list in the agent policy database 1714. For example, when the policy variable name is "QoS", the compiler 1713 generates a key "QoS:removal". The compiler 1713 then takes out the value of the policy variable "rule_removal_commands" from the action part to register it in the policy rule delete command list.

In step 1914, the compiler 1713 prepares for registering four pairs of command templates and template fillers in the agent policy database 1714. The four templates are generated at the time of distribution and deletion of a policy whose translation method is defined by the inputted policy. The templates are used for initialization and termination. In other words, firstly, the compiler 1713 adds a character string ":installation_prologue" to the policy class name (the value of the policy variable "name") included in the condition part of the subject policy so as to generate a key used for a policy distribution time prologue command list in the agent policy database 1714. Then, the compiler 1713 takes out the value of the policy variable "policy_installation_prologue" from the action part and registers it in the policy distribution time prologue command list. When the policy variable "policy_installation prologue" is not included in the action part, however, the compiler 1713 empties the list.

Secondly, the compiler 1713 adds a character string ":installation_epilogue" to the policy class name (the value of the policy variable "name") included in the condition part of the subject policy so as to generate a key used for registering a policy distribution time epilogue command list in the agent policy database 1714. The compiler 1713 then takes out the value of the policy variable "policy_installation_epilogue" included in the action part to register it in the policy distribution time epilogue command list. When the policy variable "policy_installation_epilogue" is not included in the action part, the compiler 1713 empties the list.

Thirdly, the compiler 1713 adds a character string ":removal_prologue" to the policy class name (the value of the policy variable "name") included in the condition part of the subject policy so as to generate a key used for registering a policy deletion time prologue command list in the agent policy database 1714. The compiler 1713 then takes out the value of the policy variable "policy_removal_prologue" included in the action part to register it in the policy deletion time prologue command list. When the policy variable "policy_removal_ prologue" is not included in the action part, the compiler 1713 empties the list.

Fourthly, the compiler 1713 adds a character string ":removal_epilogue" to the policy class name (the value of the policy variable "name") included in the condition part of the subject policy so as to generate a key used for registering a policy deletion time epilogue command list in the agent policy database 1714. The compiler 1713 then takes out the value of the policy variable "policy_removal_epilogue" included in the action part to register it in the policy distribution time epilogue command list. When the policy variable "policy_removal_epilogue" is not included in the action part, the compiler 1713 empties the list.

In step 1920, the agent adds a character string ":rule_init" to the policy class name (the value of the policy variable "name") included in the condition part of the inputted policy so as to generate a key used for registering a policy rule translation time initializer list in the agent policy database 1714. When the policy class name is "QoS", the compiler 1713 generates a key "QoS:rule_init". The compiler 1713 then takes out a value corresponding to the policy variable "rule_initialization" included in the action part to register it in the list.

In step 1921, the compiler 1713 adds a character string ":translation" to the value type name (the value of the policy variable "name") of the policy included in the condition part of the inputted policy so as to generate a key used for registering a value translation method description list in the agent policy database 1714. For example, when the policy value type is "user_class", the compiler 1713 generates a key "user_class:translation". The compiler 1713 then takes out a value (a value translation method description list) corresponding to the policy variable "result" from the action part and registers it in the list.

Figure 20:
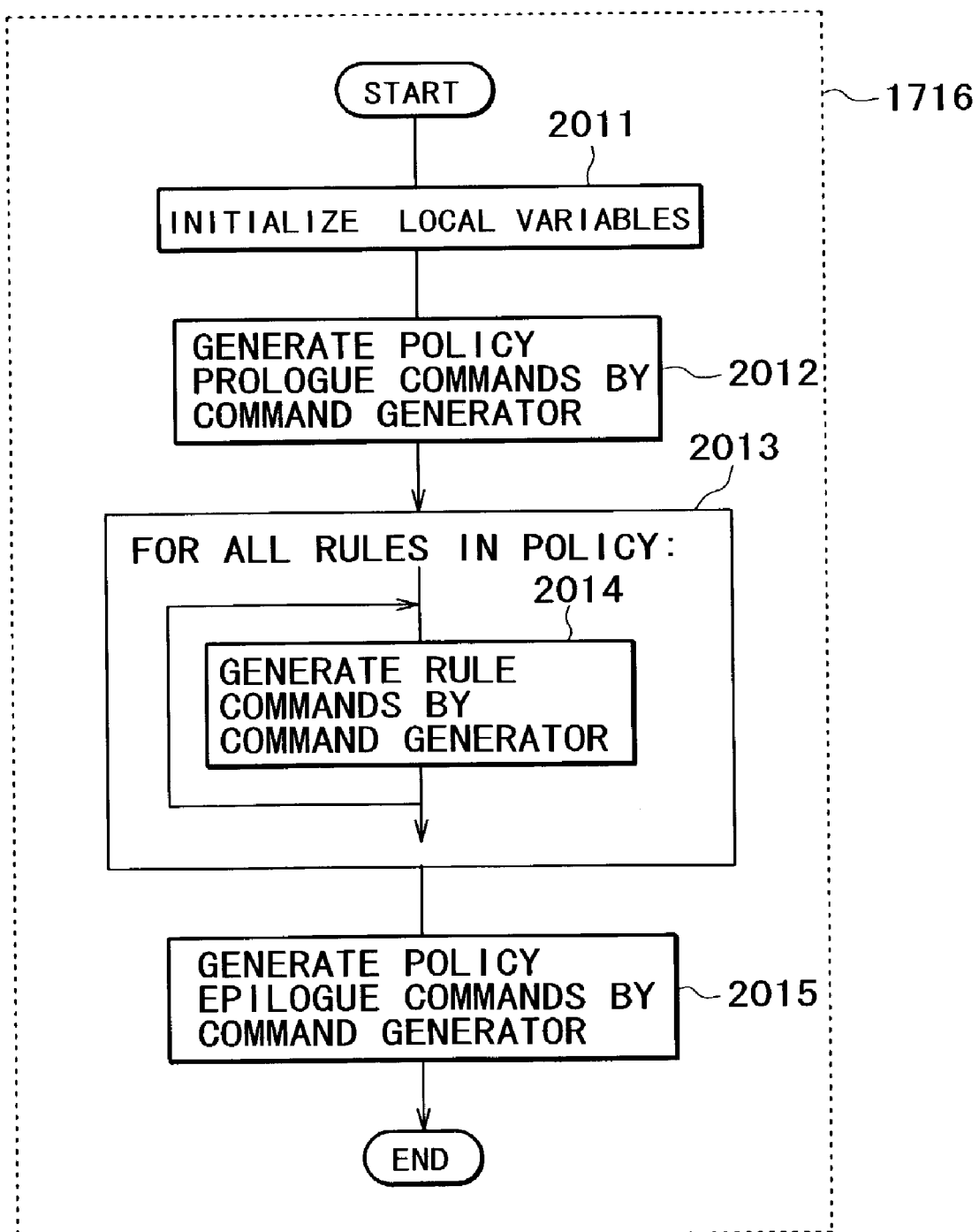
FIG. 20 is a flowchart of the functions performed by a policy translator 1715 located in the policy agent 1701 of FIG. 17.

Next, the processing procedure of the policy translator 1715 will be described with reference to FIG. 20. When the translator 1715 is started up, the translator 1715 initializes the local variables in step 2011. Because the list of local variables is registered in the agent policy database 1714, the translator 1715 searches the list in the agent policy database 1714 using a key obtained by adding a character string ":policy_init" to the inputted policy name. The list consists of pairs of variable names and their initial values, so that the translator 1715 evaluates each initial value through the interpreter 1717 and holds the result in the variable name. For example, for a pair of "ACL=list_number('ACL', 0, 1023)", the translator 1715 evaluates an expression "list_number ('ACL', 0, 1023)" through the interpreter 1717 and assumes the result (an integer) as the initial value of the variable ACL.

Then, the translator 1715 generates a policy prologue command sequence in step 2012. When policy distribution is specified (install request), the translator 1715 searches the policy distribution time prologue command list in the agent policy database 1714 using a key obtained by adding a character string ":installation_prologue" to the subject policy class name. When policy deletion is specified (remove request), the translator 1715 searches the policy deletion time prologue command list in the agent policy database 1714 using a key obtained by adding a character string ":removal_ prologue" to the subject policy class name. The translator 1715 then calls the command translator 1716 to generate a command sequence from the obtained command list.

In step 2013, the translator 1715 obtains a command sequence corresponding to each policy rule included in the subject policy. In other words, the translator 1715 executes the processing in step 2014 for each policy rule. In step 2014, when policy distribution is specified (install request), the translator searches a policy rule distribution command list in the agent policy database 1714 called using a key obtained by adding a character string ":installation" to the policy class name of the subject policy. When policy deletion is specified (remove request), the translator searches a policy rule deletion command list in the agent policy database 1714 using a key obtained by adding a character string ":removal" to the policy class name of the subject policy. The translator 1715 then calls the command translator 1716 to generate a command sequence from the obtained command list.

Finally, the translator 1715 generates a policy epilogue command sequence in step 2015. When policy distribution is specified (install request), the translator 1715 searches the policy distribution time epilogue command list in the agent policy database 1714 using a key obtained by adding a character string ":installation_epilogue" to the policy class name of the subject policy. When policy deletion is specified, the translator 1715 searches the policy deletion time epilogue command list in the agent policy database 1714 using a key obtained by adding a character string ":removal_epilogue" to the policy class name of the subject policy. The translator 1715 then calls the command translator 1716 to generate a command sequence from the obtained command list.

The command sequences generated in the above steps are combined in the order they are generated so as to form a command sequence to be set for the target device.

Figure 21:
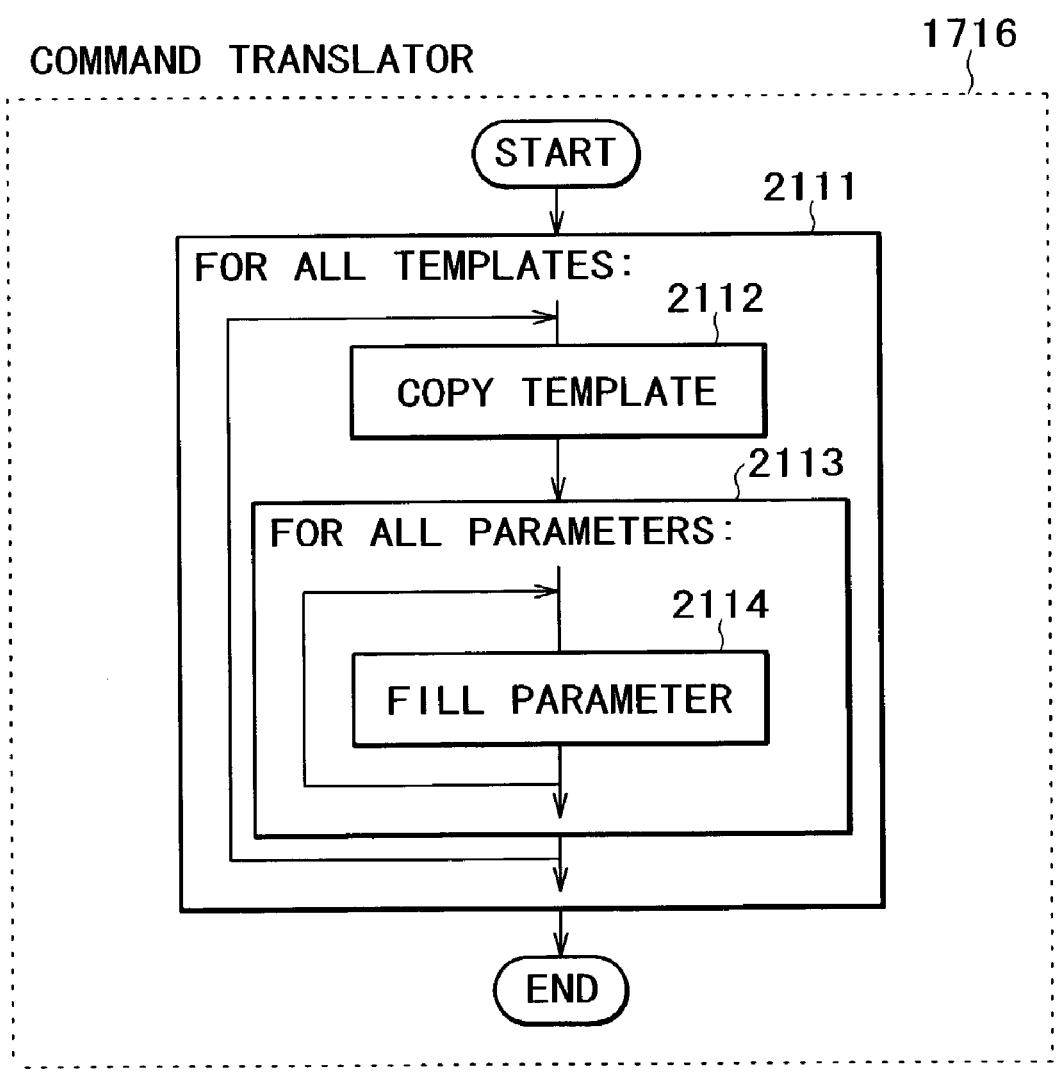
FIG. 21 is a flowchart of the functions performed by a command translator 1716 located in the policy agent 1701 of FIG. 17.

Next, the processing procedure of the command translator 1716 will be described with reference to FIG. 21. When the command translator 1716 is started up, the translator 1716 executes the processing in each of the steps 2112 to 2114 for the template of every command included in the command list input in step 2111. The command list includes a pair of lists: a list of command templates and a list of fillers that can fill their corresponding parameters. In step 2112, the translator 1716 makes a copy of a template. In step 2113, the translator 1716 fills parameters included in the copied template with the fillers sequentially. In other words, the translator 1716 executes every parameter included in the template sequentially in step 2114. In step 2114, the translator 1716 also calls the interpreter 1717 to evaluate each template filler included in the command list to fill each of the parameters according to a value obtained in the evaluation.

The manner in which parameters are filled depends on the type of the command. First, when a generated command is written in a hardware table, that is, when the first element in a command list means a hardware table, parameters are written in the table in the table format. For example, in a command list specified by a pair 417 (see FIG. 4) of a policy variable and its value, the first element "InterfaceTable[Interface]" means the hardware table, thereby a command is generated for the hardware table. The translator 1716 thus takes out the first element "I" from the format "ICC", as well as the first filler "dontCare" to evaluate "dontCare". Because "dontCare" means that no value is to be stored, the translator 1716 does not store the value. The translator 1716 then takes out the second element "C" and the second filler "ACL" to evaluate the "ACL" through the interpreter 1717 to obtain the value. Because the ACL denotes a local variable, the translator 1716 obtains the value and stores it in the third byte in the table. Finally, the translator 1716 takes out the third element "C" and the third filler "1" to evaluate the "1" through the interpreter 1717. The translator 1716 stores the result, that is, "1" in the fourth byte in the table.

Second, when a command-line interface is to be generated, that is, when the first element in the command list is "CLI", the translator 1716 generates commands line by line. For example, in a command list specified by a pair 517 of a policy variable and its value, the translator 1716 generates commands only for a line. See FIG. 5. Namely, at first, the translator 1716 evaluates "condition('user_class')" through the interpreter 1717 to obtain the result, which is a character. string "Userid('Mike', 'Cindy', 'Dick')". Then, the translator 1716 evaluates "default" through the interpreter 1717 while the "default" is kept as is. When the translator 1716 fills a parameter "% s" in the command template "allocate-servers % s % s", the translator 1716 obtains a command sequence "allocate-servers Userid('Mike', 'Cindy', 'Dick') default".

Third, when a write command that specifies writing in the MIB by the SNMP is to be generated, that is, when the first element in the command list is "SNMP", the translator 1716 generates a configuration command at that time. For example, in a command list specified by a pair 617 of a policy variable and its value, the translator 1716 generates the following two commands. See FIG. 6. At first, the translator 1716 evaluates "condition('user_class')" through the interpreter 1717 to obtain a result "SalesDB". Consequently, the translator 1716 generates a command sequence "set(storage_mib.caching. unit, 'SalesDB')". The translator 1716 then evaluates a character string "nocache" through the interpreter 1717. However, because the value is returned to the operator console 211 as is, the translator 1716 generates a command sequence "set(storage_mib.caching.strategy, 'nocache')".

At this time, character strings 'SalesDB' and 'nocache' are encoded by the device commander 1718 before they are sent out.

Next, the functions of the interpreter 1717 will be described with reference to FIG. 22. When the interpreter 1717 is started up, the interpreter 1717 determines, in step 1911, the expression type to translate. When the expression includes an operator, the interpreter 1717 goes to step 1912. When the expression includes a constant, the interpreter 1717 goes to step 1921. When the expression includes a local variable, the interpreter 1717 goes to step 1931. When the expression includes a function, the interpreter goes to step 1941.

In step 1912, the interpreter 1717 evaluates each operand in the expression by a recursive interpreter call. When the expression is a conditional one, that is, when the format is like x || y or x ? y: z, only the "x" is evaluated.

In step 1913, the interpreter 1717 evaluates the result by substituting it for the operator in the expression. For example, when the expression is x ==y and x is equal to y, 1 is returned to the operator console 211. Otherwise, 0 is returned to the operator console 211. When the expression is x ? y:z and the x value is 1, the "y" is evaluated by a recursive interpreter call and the evaluated value is returned to the operator console 211. When the "x" value is 0, the "z" is evaluated by a recursive interpreter call and the evaluated value is returned to the operator console 211. When the expression is "condition (x) || y" or "action(x) || y" and a policy variable "x" appears in the condition or action part, the interpreter 1717 returns the value to the operator console 211. Otherwise, the interpreter 1717 returns the "y" value to the operator console 211. At this time, the values of the function "condition(x)" and "action (x)" are returned to the operator console 211 in accordance with the method employed in step 1941. Then, the interpreter 1717 terminates the function as shown in FIG. 22.

In step 1921, the interpreter 1717 obtains the constant value and returns the obtained value to the operator console 211. For example, when the constant is 1, the interpreter returns an integer 1 to the operator console 211. When the constant is a character string "default", the interpreter 1717 returns a character string "default" to the operator console 211. When the constant is "dontCare", the interpreter 1717 returns a value "dontCare" to the operator console 211. The interpreter 1717 then terminates the function as shown in FIG. 22.

In step 1931, the interpreter 1717 obtains the value of the local variable and returns the obtained value to the operator console 211. For example, when the local variable is "Interface", the interpreter 1717 returns the value, that is, the device interface number to the operator console 211. The interpreter 1717 then terminates the function as shown in FIG. 22.

In step 1941, the interpreter 1717 determines the function name. When the name is "condition", the interpreter 1717 goes to step 1942. When the name is "action", the interpreter 1717 goes to step 1943. When the name is "list_number", the interpreter 1717 goes to step 1944. In step 1942, the interpreter 1717 uses the value of the policy variable having a name given as a function argument and appearing in the condition part of the policy rule that is being translated so as to obtain the value as follows.

In step 1941, when the expression is "condition(x)", the interpreter 1717 obtains the value as follows. At first, the interpreter 1717 searches a translation method in the agent policy database 1714 using a character string key obtained by adding a character string ":translation" to another character string that is the "x" value. Then, the interpreter 1717 uses the result of the translation of the policy variable "x" to appear in the condition part of the policy rule that is being translated as the value of the "condition(x)" in accordance with the obtained translation method. For example, the interpreter 1717 obtains the value of the "condition('user_class')" as follows. When the value of the policy variable "user_class" is "'Sales'", the interpreter 1717 regards it as the value of the variable "value". When a translation method is defined by the pair of the policy variable and the value 813 (that is, the LAN switch 122), the interpreter 1717 replaces the variable "value" with "'Sales'" in the translation method "value=='Sales'? 10.1.0.0/255.255.0.0 value=='Development'? 10.2.0.0/255.255.0.0" and evaluates the result. Because 'Sales' == 'Sales' is true, the evaluation result becomes an 8-byte value obtained by connecting "10.1.0.0/255.255.0.0", that is, "IP address 10.1.0.0" to "mask 255.255.0.0". See FIG. 8.

In step 1941, when the expression is "action(x)", the interpreter 1717 uses the value of the policy variable "x" included in the action part of the policy rule that is being translated as is as the "action(x)" value.

For example, when the expression is "condition('user_class')", the interpreter 1717 uses the value of the policy variable "user_class" and returns the value to the operator console 211.

When the policy variable "user_class" does not appear in the condition part of the policy, the interpreter 1717 returns a special value "dontCare" that denotes that no value exists to the operator console 211. The interpreter 1717 then terminates the function as shown in FIG. 22.

Figure 22:
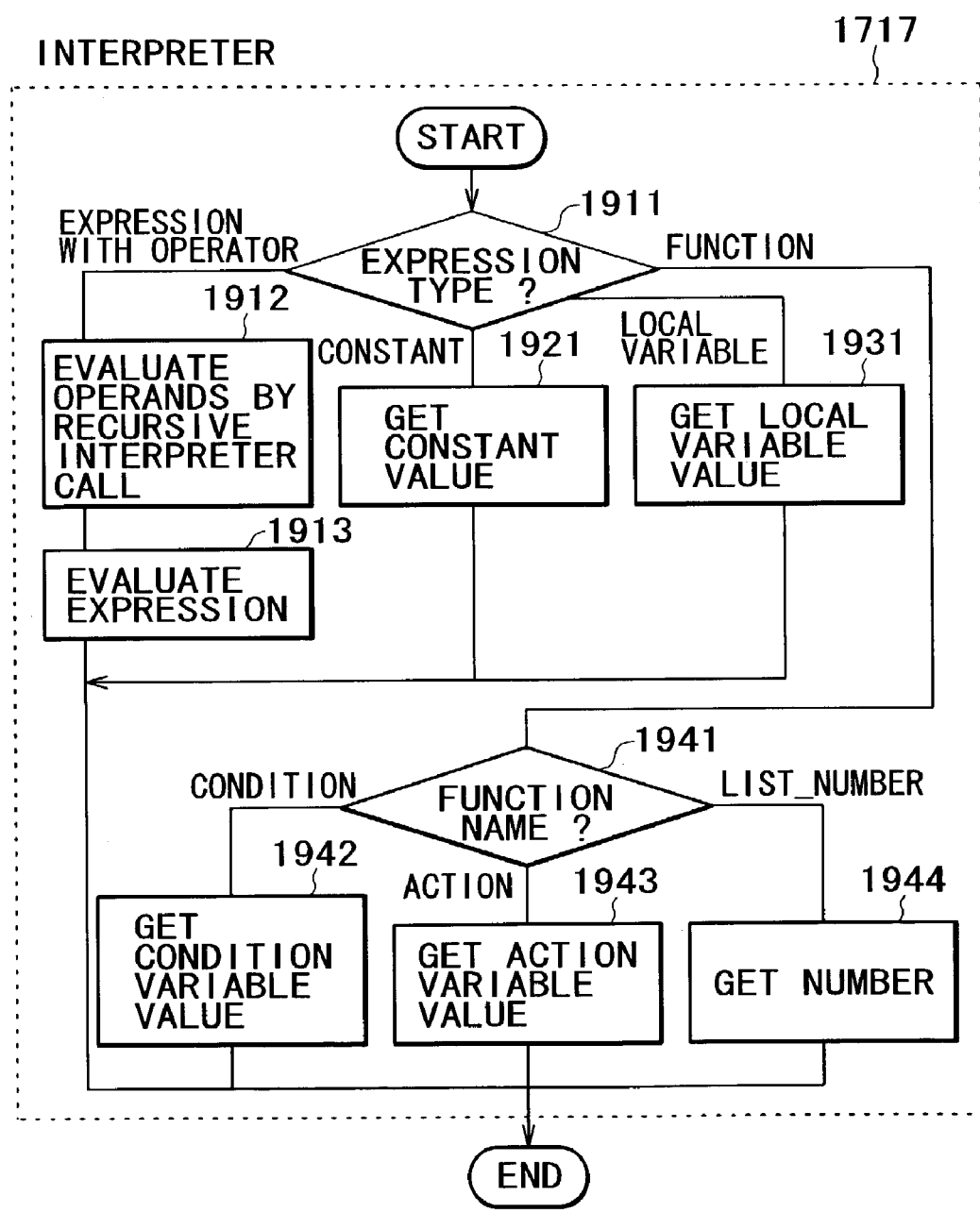
FIG. 22 is a flowchart of the functions performed by an interpreter 1717 located in the policy agent 1701 of FIG. 17.

In step 1943, the interpreter 1717 returns the value of a policy variable having a name given as a function argument and appearing in the condition part to the operator console 211, then terminates the function as shown in FIG. 22.

In step 1944, the translator 1716 adds 1 to the value linked with the first argument character string in the function call and returns the result to the operator console 211. When the value linked with the first argument is not found yet, the translator 1716 returns the second argument value, then adds 1 to the second argument value and links the result with the first argument character string. When the value to return is over the third argument value, however, the translator 1716 generates an error message and sends the message to the operator console 211. For example, when a function "list_number('ACL', 0, 1023)" is called first, that is, when the first policy rule is translated, the value 0 is returned to the operator console 211. When the "list_number('ACL', 0, 1023)" is called for each policy rule translation, the translator 1716 adds 1 to the linked value and returns the result, that is, 1, 2, . . . sequentially. When the value reaches 1023, the translator generates an error message to be returned to the operator console 211. Namely, because the hardware table size is assumed to be 1024 in this embodiment, the hardware table overflows, thereby the error message is generated.

In this exemplary embodiment, the user uses the operator console 211 to distribute the "Policies" policy 1601 and the "VariableDefinition" policy 701 to the policy manager 212. The user also uses the operator console 211 to distribute the "SwitchCommands" policy 401 and the "SwitchValueTranslation" policy 801 to the network agent 215, the "ServerCommands" policy 501 and the "ServerValueTranslation" policy 901 to the server agent 216, and the "StorageCommands" policy 601 and the "StorageValueTranslation" policy 1001 to the storage agent 217 respectively.

By executing the above operations beforehand, the number of policies to be distributed can be reduced to one, which is "PrioritizeMarketing" 1101, so as to control the LAN 121, the servers 131 and 132, and the storage devices 150 to 152. In other words, only the "PrioritizeMarketing" policy 1101 is required to be distributed to the LAN switch 122, the servers 131 and 132, and the storage devices 151 and 152 or 150. One of the three storage devices to which the policy is to be distributed is determined by which of the storage devices stores the database used by the Sales Dept. If it is not known which storage device stores the database, the policy may be distributed to all three storage devices 150, 151 and 152.

Due to the distribution of the "PrioritizeMarketing" policy 1101 as described above, it becomes possible to give priority to the traffic of the Sales Dept. over that of others so that the Sales Dept. can use 50% of each server resource and specify the storage devices to cache data. To change policies, it is only required for the user to rewrite only the "PrioritizeMarketing" 1101.

In this preferred embodiment of the present invention, to define a policy having a new function, it is only required for the user to describe a new "PolicyDefinition" policy, and another "PolicyVariableDefinition" policy as needed and distribute the policies to the policy manager 212, describe a new "PolicyToCommand" policy, and another "PolicyValueTranslation" policy as needed and distribute the policies to the network agent 215, the server agent 216, and the storage agent 217, respectively. An ordinary policy editing interface may be used to describe/change those policies. Thus, the user is not required to be specially trained to use the present invention.

When a device is added to the system, it is only required for the user to instruct the policy server 112 to make a copy of the network agent 215, the server agent 216, or the storage agent 217 and distribute the "PolicyToCommand" and "PolicyValueTranslation" policies to the generated agent. Thus, the present invention allows policies to be developed quickly on sites and applied to new devices provided with new device interfaces and new commands as needed .

Another preferred embodiment of the present invention comprising a variation of the above first preferred embodiment is described below.

Expression Input to Interpreter

First, in this exemplary embodiment, an operator and a function are preferably used to obtain a value to be used in a command from a value specified by a policy rule while the interpreter is not used to calculate any function other than the operator and the "list_number", as described with respect to the first exemplary embodiment above. For example, in a policy rule, a DSCP (Diffserv Code Point) value 46 to be set in an IP packet is specified by a policy variable DSCP. In a command, however, when a TOS (Type Of Service) value 264 is required to be specified, an expression "4*DSCP" is used to obtain the product of the DSCP value and use it as the TOS value.

CLI Check by "List_number" Function

Second, while the "list_number" function is used to check hardware table overflows in the above first exemplary embodiment, the "list_number" function can also be used to check each command argument value range in the CLI. For example, when an "access-list" command is to be generated in a "PolicyToCommand" policy for a CISCO® router, the first argument in the access-list command cannot exceed the predetermined range, since the access control list number to be generated by the command is determined strictly by the operating system IOS. For example, the extended IP access list number must be within 2300 to 2699. In this connection, a function call "list_number(ACL', 2300, 2699)" is used to generate a predetermined number range. When the access list number exceeds this range, its error message is generated.

Addition of Defined Policy Class to GUI

Third, in the first exemplary embodiment described above, addition and deletion of entities through the operator console 211 are preferably always requested to the policy manager 212 through the operator console 211. Consequently, even when a "PolicyDefinition" policy is distributed to the policy manager 212 to define a new policy class, the defined policy class is not displayed in the policy class list 312. To match the displayed policy list 312 with the policy class list defined in the policy manager 212, therefore, an interface is required to be added to the system. When a policy class is defined in or deleted from the policy manager 212, the interface is used to notify the operator console 211 of the definition or deletion. In other words, when a "PolicyDefinition" policy is defined in or deleted from the policy manager controller 1212, that is, just after the processing step 1345 or 1346, a notice of "created(name)" or "deleted(name)" is required to be identified to the operator console 211 through the upper layer receiver 1211. The "created"/"deleted" is a notice name and "name" is the name of the policy class to be defined/deleted. Receiving such a notice, the operator console 211 adds/deletes the policy class to/from the policy class list 312.

The addition/deletion of an entity according to a notice from the policy manager 212 can apply not only to policy class names, but also to policy names and policy rules. Consequently, addition/deletion of an entity from any device other than the operator console 211 can be displayed on the screen of the operator console 211.

Syntax Check on GUI

Fourth, when an illegal policy variable name included in a policy input from the operator console 211 is used or when a policy variable and its value type do not match in the above first exemplary embodiment, it is regarded as an error, which is detected by the policy manager 212 and reported to the operator console 211. However, before an input entity is sent to the policy manager 212, such an error-included description should preferably be detected immediately. To achieve this, the following method is effective and preferably employed by the present invention. When a policy rule is to be input to the operator console 211, the user is requested to input the policy class name of the policy to which the policy rule belongs in advance and a policy variable and its value are input one by one to the condition and action parts of the policy rule, respectively.

Receiving a policy variable, the operator console 211 makes an inquiry to the policy manager 212 about the policy class name through a request interface "is_valid_variable (class_name, condition_or_action, variable_name)". The "class_name" specifies a policy class name and the "condition_or_action" denotes distinctions between the condition part and action part. The "variable_name" specifies a policy variable name. The policy manager 212, when receiving this request, searches it in the server policy database 1214 to check whether or not the policy variable will appear in the specified condition part or action part. The policy manager 212 then returns the result to the operator console 211. When the policy variable does not appear in the specified condition nor in the action part, the operator console 211 displays the error message and rejects the user input.

Sending Commands from COPS-PR

Fifth, the LAN switch 122 is set in the hardware table in the network agent 215 in the above first exemplary embodiment. However, many network devices have a command-line interface, an MIB to be set by the protocol SNMP, a PIB (Policy Information Base) to be set by the protocol COPS-PR, etc. Consequently, the policy agent to be set in each of those network devices can use any of those interfaces. When the COPS-PR is used, the policy agent can use the decision (install/remove) command instead of the configuration command in the SNMP.

Using the XML

Sixth, in the above first exemplary embodiment, preferably only the GUI interface is used to input policies. In this additional preferred embodiment of the present invention, however, the XML interface preferably can be used to input policies. In other words, the policy manager controller 1212 can receive a policy-described XML text through an XML parser instead of receiving the text through the upper layer receiver 1211. It is apparent that each policy can be described by an XML text. For example, a "PolicyDefinition" policy 1601 can be described as an XML text as follows.

```
<policy>
    <name>Policies</name>
    <class>PolicyDefinition</class>
    <conditions>
        <condition>
            <variable>name</variable><value>QoS</value>
        </condition>
    </conditions>
    <actions>
        <action>
            <variable>condition_variables</variable>
            <value><list><element>user_class</element></list></value>
        </action>
        <action>
            <variable>action_variables</variable>
            <value><list><element>access</element></list></value>
        </action>
    </actions>
</policy>
```

Here, the <policy> . . . </policy> means a tag denoting that the " . . . " specifies a policy. The <name> . . . </name> means a tag denoting that the " . . . " specifies a name. The </class> </class> means a tag denoting that the " . . . " specifies a policy class. The <conditions> . . . </conditions> means a tag denoting that the " . . . " specifies a condition part. The <condition> . . . </condition> means a tag denoting that the " . . . " specifies a condition. The <variable> . . . </variable> means a tag denoting that the " . . . " specifies a variable name. The <value> . . . </value> means a tag denoting that the " . . . " specifies a variable value. The <actions> . . . </actions> means a tag denoting that the " . . . " specifies an action part. The <action> . . . </action> means a tag denoting that the " . . . " specifies an action. The <list> . . . </list> means a tag denoting that the value specifies a list. The <element> . . . </element> means a tag denoting that the " . . . " specifies an element of the list.

The above-described XMP text is formatted so as to enable any policies to be described. Consequently, just like in the first exemplary embodiment above, the method for inputting ordinary policies can be used to input policy definitions and policy translation method definitions. However, dedicated tags can also be used to define policies and policy translation methods. For example, a "PolicyDefinition" policy 1601 can be described as the following XML text.

```
<policy>
    <name>Policies</name>
    <class>PolicyDefinition</class>
```

-continued

```
<policyname>Qos</policyname>
<condition_variables>
    <variable>user_class</variable>
</condition_variables>
<action_variables>
    <variable>access</variable>
</action_variables>
<policy>
```

Here, the <policyname> . . . </policyname> denotes that the " . . . " specifies a policy name to be defined. The <condition_variables> . . . </condition_variables> denotes that the " . . . " specifies a variable list to appear in the condition part. The <action_variables> . . . </action_variables> denotes that the " . . . " specifies a variable list to appear in the action part.

The present invention as described above in the various preferred embodiments, therefore, makes it possible to add/delete policies to/from the subject policy system easily as needed with use of existing interfaces. Furthermore, it is possible to apply policies developed quickly on-site to a new device provided with a new device interface and a new command as needed.

Nothing in the above description is meant to limit the present invention to any specific materials, geometry, or orientation of parts. Many part/orientation substitutions are contemplated within the scope of the present invention. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A policy system for controlling one or more devices connected to a network using a policy comprising: a policy manager for managing device independent policies;
   a policy agent for translating said device independent policies to device dependent policies;
   a receiver unit for receiving at least one new translation rule applicable to one of the devices provided with a new device interface requiring a new command, thereby translating a specific type policy to a command string for said device provided with said new device interface; and
   a compiler for compiling the at least one new translation rule,
   wherein said policy manager, when instructed to distribute a first policy comprising the at least one compiled new translation rule for translating a specific type policy to a command string for said device provided with said new device interface, sends a policy apply request that includes said first policy to said policy agent and said policy agent stores said first policy, and
   wherein said policy agent, when receiving a second policy, translates said second policy to a command string using said at least one compiled new translation rule and sends said command string to said device provided with said new device interface,
   wherein said new translation rule comprises a command template and a data generating device that provides a variable value in part of said command template,
   wherein said new translation rule is described using said command template and said data generating device that generates data in a function call format that specifies first and second integers as arguments, and
   wherein said data generating device fills a variable part of said command template with an integer within a range between said first and second integers to generate a command in accordance with said new translation rule and outputs an error message when no integer is found in said range.

2. The policy system of claim 1 wherein said policy manager, when instructed to delete said first policy from said policy agent, sends a policy delete request that includes the name of said first policy to said policy agent and said policy agent deletes said stored first policy in response to said delete request.

3. A policy server for controlling one or more devices connected to a network comprising:
   one or more translation rules for translating policies to command strings, the one or more translation rules being received by and stored in said policy server;
   a receiver unit for receiving at least one further translation rule, and
   a compiler for compiling the at least one further translation rule, wherein said policy server, upon receiving a first policy, uses the at least one further compiled translation rule to translate said first policy to a first command string for a first device,
   wherein said further translation rule comprises a command template and a data generating device that provides a variable value in part of said command template,
   wherein said further translation rule is described using said command template and said data generating device that generates data in a function call format that specifies first and second integers as arguments, and
   wherein said data generating device fills a variable part of said command template with an integer within a range between said first and second integers to generate a command in accordance with said further translation rule and outputs an error message when no integer is found in said range.

4. The policy server of claim 3 wherein said policy server, upon receiving a second policy, uses a second of said translation methods to translate said second policy to a second command string for said first device.

5. The policy server of claim 3 further comprising one or more policy definitions residing in or received by said policy server wherein said policy server, upon receiving any policy not matching one of said policy definitions, outputs an error message.

6. The policy server of claim 3 wherein said first device includes a command-line/interface and said data generating device uses a command character string template located in said command-line/interface as said command template to generate said character string.

7. The policy server of claim 3 wherein said first device includes a management information base set by an SNMP using said command template to produce a set command for said management information base and said data generating device fills an argument of said set command.

8. The policy server of claim 3 wherein said device includes a policy information base set by a COPS-PR protocol using said command template to produce a set command for said policy information base and said data generating device fills an argument of said set command.

9. The policy server of claim 3 wherein data corresponding to said device is written and set in a hardware table, said command template indicates a location and width of said data in said hardware table, and said data generating device generates values to be written for said location and width.

10. The policy server of claim 3 wherein said first policy comprises a name and a definition of a first policy class stored in said policy server; and wherein said policy server, when instructed by a user interface to distribute said first policy, adds the name of said first policy class to a policy list displayed in said user interface.

11. The policy server of claim 10
wherein said policy server, when instructed by a user interface to delete said first policy, deletes the name of said policy class from said policy class list displayed in said user interface.

12. The policy server of claim 3 wherein said first policy comprises a list of pairs of variables and values stored in said policy server, and a policy definition comprising a list of variable names appearing in said policy, wherein said policy server, upon receipt of a policy having a variable not included on said list of variable names of said policy definition, outputs an error message.

13. The policy server of claim 3 wherein said first policy is described in a list format comprising pairs of variables and values, and data comprising a list of types of values to be substituted for a respective name variable stored in said policy server, wherein upon receipt of a policy of said specific type, outputs an error message when a value type not included on said list of types of values is substituted for said name variable in said policy.

14. The policy server of claim 3 further comprising an interpreter for evaluating an expression, wherein said further translation rule comprises a command template and a data generating device that provides a variable value in part of said command template, and wherein said further translation rule is described with said command template and said data generating device that generates data in an expression format that includes an operator or function call.

15. The policy server of claim 14 wherein said data generating device fills a variable part of said command template to generate a command according to a result of an evaluation by said interpreter.

16. The policy server of claim 3 wherein said policy server uses a second translation method to translate said first policy to a second command string for a second device.

* * * * *